(12) United States Patent
Wilenski et al.

(10) Patent No.: US 10,105,893 B1
(45) Date of Patent: Oct. 23, 2018

(54) FEEDSTOCK LINES FOR ADDITIVE MANUFACTURING OF AN OBJECT, AND SYSTEMS AND METHODS FOR CREATING FEEDSTOCK LINES

(71) Applicant: The Boeing Company, Chicago, IL (US)

(72) Inventors: Mark Stewart Wilenski, Mercer Island, WA (US); Michael Patrick Kozar, Mercer Island, WA (US); Samuel F. Harrison, Lynnwood, WA (US); Nick Shadbeh Evans, Lynnwood, WA (US); Faraón Torres, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/706,510

(22) Filed: Sep. 15, 2017

(51) Int. Cl.
*G02B 6/44* (2006.01)
*B29C 64/118* (2017.01)
(Continued)

(52) U.S. Cl.
CPC ............ *B29C 64/118* (2017.08); *B29C 64/40* (2017.08); *B33Y 70/00* (2014.12); *B29C 64/00* (2017.08);
(Continued)

(58) Field of Classification Search
CPC ....... B29C 64/40; B29C 64/00; B29C 64/118; B29C 64/106; B29C 64/159;
(Continued)

(56) References Cited

U.S. PATENT DOCUMENTS 3,600,272 A 8/1971 Cortigene et al.
3,813,976 A 6/1974 Greer
(Continued)

FOREIGN PATENT DOCUMENTS

CN 102516866 6/2012
DE 201310103973 10/2014
(Continued)

OTHER PUBLICATIONS

Igor Volyanskii and Igor V. Shishkovsky (2016). Laser-Assisted 3D Printing of Functional Graded Structures from Polymer Covered Nanocomposites: A Self-Review, New Trends in 3D Printing, Prof. Igor Shishkovsky (Ed.), InTech, DOI: 10.5772/63565. Available from: https://mts.intechopen.com/books/new-trends-in-3d-printing/laser-assisted-3d-printing-of-f.*

(Continued)

*Primary Examiner* — Thomas A Hollweg
*Assistant Examiner* — Guy Anderson
(74) *Attorney, Agent, or Firm* — Dascenzo Intellectual Property Law, P.C.

(57) ABSTRACT

A feedstock line comprises elongate filaments, a resin, and optical direction modifiers. The resin covers the elongate filaments. The optical direction modifiers are covered by the resin and are interspersed among the elongate filaments. Each of the optical direction modifiers has an outer surface. Each of the optical direction modifiers is configured such that when electromagnetic radiation strikes the outer surface from a first direction, at least a portion of the electromagnetic radiation departs the outer surface in a second direction that is at an angle to the first direction to irradiate, in the interior volume of the feedstock line, the resin that, due at least in part to the elongate filaments, is not directly accessible to the electromagnetic radiation, incident on the exterior surface of the feedstock line.

67 Claims, 13 Drawing Sheets

(51) Int. Cl.
*B29C 64/40* (2017.01)
*B33Y 70/00* (2015.01)
B33Y 30/00 (2015.01)
B33Y 10/00 (2015.01)
B29C 67/00 (2017.01)
B29C 64/159 (2017.01)
B29C 64/20 (2017.01)
B29C 64/00 (2017.01)
B29C 64/106 (2017.01)

(52) U.S. Cl.
CPC .......... B29C 64/106 (2017.08); B29C 64/159 (2017.08); B29C 64/20 (2017.08); B29C 67/00 (2013.01); B33Y 10/00 (2014.12); B33Y 30/00 (2014.12)

(58) Field of Classification Search
CPC ... B29C 64/314; B29C 64/321; B29C 64/329; B29C 64/336; B32B 38/10
USPC ......................................................... 385/125
See application file for complete search history.

(56) References Cited

U.S. PATENT DOCUMENTS

| | | | |
|---|---|---|---|
| 4,378,343 A | 3/1983 | Sugiura et al. | |
| 4,435,246 A | 3/1984 | Green | |
| 5,204,124 A | 4/1993 | Secretan et al. | |
| 5,294,461 A | 3/1994 | Ishida | |
| 5,398,193 A | 3/1995 | deAngelis | |
| 5,495,328 A | 2/1996 | Spence et al. | |
| 5,594,652 A * | 1/1997 | Penn | H05K 3/125 345/419 |
| 5,936,861 A | 8/1999 | Jang et al. | |
| 6,129,872 A | 10/2000 | Jang | |
| 6,169,605 B1 * | 1/2001 | Penn | B33Y 50/00 358/1.1 |
| 6,214,279 B1 | 4/2001 | Yang et al. | |
| 6,722,872 B1 | 4/2004 | Swanson et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,102,099 B1 * | 8/2015 | Karpas | B29C 67/0055 |
| 9,149,989 B2 | 10/2015 | Uckelmann | |
| 2003/0044593 A1 | 3/2003 | Vaidyanathan et al. | |
| 2004/0119188 A1 | 6/2004 | Lowe | |
| 2005/0004282 A1 * | 1/2005 | Priedeman, Jr. | B29C 41/08 524/115 |
| 2005/0038222 A1 | 2/2005 | Joshi et al. | |
| 2005/0104241 A1 | 5/2005 | Kritchman et al. | |
| 2005/0116391 A1 | 6/2005 | Lindemann et al. | |
| 2006/0255486 A1 | 11/2006 | Benson, Jr. et al. | |
| 2008/0315462 A1 | 12/2008 | Batzinger et al. | |
| 2009/0095410 A1 | 4/2009 | Oldani | |
| 2010/0024964 A1 | 2/2010 | Ingram, Jr. et al. | |
| 2010/0084087 A1 | 4/2010 | McCowin et al. | |
| 2010/0190005 A1 | 7/2010 | Nair et al. | |
| 2011/0147993 A1 | 6/2011 | Eshed et al. | |
| 2013/0337256 A1 * | 12/2013 | Farmer | B29C 47/0002 428/292.1 |
| 2014/0061974 A1 | 3/2014 | Tyler | |
| 2014/0263534 A1 | 9/2014 | Post et al. | |
| 2014/0265040 A1 | 9/2014 | Batchelder | |
| 2014/0287139 A1 * | 9/2014 | Farmer | B05D 3/002 427/212 |
| 2014/0291886 A1 | 10/2014 | Mark et al. | |
| 2015/0008422 A1 | 1/2015 | Lee et al. | |
| 2015/0037599 A1 | 2/2015 | Blackmore | |
| 2015/0048553 A1 | 2/2015 | Dietrich et al. | |
| 2015/0072293 A1 * | 3/2015 | DeSimone | B29C 67/007 430/322 |
| 2015/0140230 A1 | 5/2015 | Jones et al. | |
| 2015/0174824 A1 | 6/2015 | Gifford et al. | |
| 2015/0217517 A1 * | 8/2015 | Karpas | B29C 67/0055 264/464 |
| 2015/0291833 A1 | 10/2015 | Kunc et al. | |
| 2015/0321420 A1 * | 11/2015 | Karpas | B29C 67/0055 425/3 |
| 2016/0136897 A1 | 5/2016 | Nielsen-Cole et al. | |
| 2016/0159009 A1 | 6/2016 | Canale | |
| 2016/0281267 A1 * | 9/2016 | Wetzel | C03B 37/027 |
| 2016/0297104 A1 * | 10/2016 | Guillemette | B29C 64/106 |
| 2016/0303793 A1 | 10/2016 | Ermoshkin et al. | |
| 2017/0028623 A1 | 2/2017 | Evans et al. | |
| 2017/0028628 A1 | 2/2017 | Evans et al. | |
| 2017/0028633 A1 | 2/2017 | Evans et al. | |
| 2017/0028635 A1 | 2/2017 | Evans et al. | |
| 2017/0028638 A1 | 2/2017 | Evans et al. | |
| 2017/0028644 A1 | 2/2017 | Evans et al. | |
| 2017/0129180 A1 | 5/2017 | Coates et al. | |
| 2017/0151733 A1 | 6/2017 | Lewis et al. | |
| 2017/0157855 A1 * | 6/2017 | Larson | B33Y 30/00 |
| 2017/0174932 A1 * | 6/2017 | Granlund | C08L 55/02 |
| 2017/0225394 A9 * | 8/2017 | Rodgers | B29C 64/106 |
| 2017/0252967 A9 * | 9/2017 | Guillemette | B29C 64/118 |

FOREIGN PATENT DOCUMENTS

| | | |
|---|---|---|
| WO | WO 2006/020685 | 2/2006 |
| WO | WO 2012/039956 | 3/2012 |
| WO | WO 2013/086577 | 6/2013 |
| WO | WO 2014/153535 | 9/2014 |
| WO | WO 2015/009938 | 1/2015 |
| WO | WO 2016/053681 | 4/2016 |

OTHER PUBLICATIONS 3D printing with polymers: Challenges amongexpanding options and opportunitiesJ by Stansbury et al.*
3D-Printing of Meso-structurally Ordered Carbon Fiber/Polymer Composites with Unprecedented Orthotropic Physical Properties by Iewicki et al.*
A review on 3D micro-additive manufacturing technologies by Vaezi et al.*
Polymers for 3D Printing and Customized Additive Manufacturing by Ligon et al.*
Machine generated English translation of abstract for DE 201310103973 downloaded from Espacenet.com on Nov. 1, 2017.
Website screenshots showing Stratonics ThermaViz® Sensor Systems, from Stratonics.com website, downloaded on Nov. 4, 2016.
Printout of online article, "Improving Additive Manufacturing (3D Printing) using Infrared Imaging," Aug. 10, 2016, from AZoM.com website, downloaded on Nov. 4, 2016.
U.S. Appl. No. 15/642,787, filed Jul. 6, 2017, Wilenski et al.
U.S. Appl. No. 15/642,705, filed Jul. 6, 2017, Wilenski et al.
U.S. Appl. No. 15/610,466, filed May 31, 2017, Wilenski et al.
U.S. Appl. No. 15/367,021, filed Dec. 1, 2016, Wilenski et al.
U.S. Appl. No. 15/356,420, filed Nov. 18, 2016, Wilenski et al.
U.S. Appl. No. 15/346,537, filed Nov. 8, 2016, Wilenski et al.
U.S. Appl. No. 15/345,189, filed Nov. 7, 2016, Wilenski, et al.
Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.
Printout of online article, Jeff Sloan, "Arevo Labs launches 3D printing platform for composite parts fabrication," Nov. 16, 2015, from CompositesWorld.com website, downloaded on Dec. 9, 2015.
Website screenshots of online how-to article, "Fiber Composite 3D Printing (The Bug)," from Instructables.com website, downloaded on Aug. 20, 2015.
Printout of website showing FormLabs, Frequently Asked Questions (re the Form1+ SLA 3D Printer), from FormLabs.com website, downloaded on Aug. 19, 2015.
Website screenshots showing The Form 1+ SLA 3D Printer, from FormLabs.com website, downloaded on Aug. 20, 2015.
Printout of online article "Carbon3D Introduces Breakthrough CLIP Technology for Layerless 3D Printing, 25-100x Faster," Mar. 17, 2015, from 3Ders.org website, downloaded on Aug. 19, 2015.

(56) References Cited

OTHER PUBLICATIONS

Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing the Mark One Composite 3D Printer, from MarkForged.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Printout of online article "Automated Fiber Placement," from AutomatedDynamics.com website, downloaded on Aug. 19, 2015.
User Manual for 3Doodler 2.0, from The3Doodler.com website, downloaded on Aug. 19, 2015.
Website screenshots showing "Fiber Composite 3D Printing," from MakeZine.com website, downloaded on Jun. 2, 2015.
Farshidianfar et al., "Real-Time Control of Microstructure in Laser Additive Manufacturing," International Journal of Advanced Manufacturing Technology (2016), vol. 82, pp. 1173-1186, published online Jul. 1, 2015.
Hu et al., "Sensing, Modeling and Control for Laser-Based Additive Manufacturing," International Journal of Machine Tools and Manufacture, No. 43, pp. 51-60, 2003.
Gupta et al., "Dual Curing of Carbon Fiber Reinforced Photoresins for Rapid Prototyping," Polymer Composites, vol. 23, No. 6, pp. 1162-1170, Dec. 2002.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Ogale et al., "3-Dimensional Composite Photolithography," Proceedings of the American Society for Composites, Eleventh Technical Conference, pp. 822-828, Oct. 7-9, 1996.
Ogale et al., "Fabrication of Fiber Reinforced Plates with Curvilinear Layout by 3-D Photolithography," $26^{th}$ International SAMPE Technical Conference, vol. 26, pp. 54-61, Oct. 17-20, 1994.
Machine-generated English translation of the abstract for CN 102516866, downloaded from Espacenet.com on May 17, 2018.

* cited by examiner

FEEDSTOCK LINES FOR ADDITIVE MANUFACTURING OF AN OBJECT, AND SYSTEMS AND METHODS FOR CREATING FEEDSTOCK LINES

FIELD

The present disclosure relates to additive manufacturing.

BACKGROUND

A 3D printing process may use a feedstock material, extruded from a print head, to additively manufacture a part by layering the feedstock material. The feedstock material may comprise a polymer and reinforcing fibers, such as carbon fibers, which are opaque to visible and ultra-violet light. When the polymer in the feedstock material is a photopolymer, a source of curing energy may be directed at the feedstock material, dispensed by the print head, to solidify the feedstock material. However, when the reinforcing fibers are opaque to the curing energy, they cast shadows and prevent the curing energy, originating directly from the source of curing energy, from irradiating and curing the photopolymer in the shadows.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a feedstock line for additive manufacturing of an object. The feedstock line has a feedstock-line length and an exterior surface, defining an interior volume of the feedstock line. The feedstock line comprises elongate filaments, a resin, and optical direction modifiers. The elongate filaments extend along at least a portion of the feedstock-line length. The resin covers the elongate filaments. The optical direction modifiers each extend along only a portion of the feedstock-line length. The optical direction modifiers are covered by the resin and are interspersed among the elongate filaments. Each of the optical direction modifiers has an outer surface. Each of the optical direction modifiers is configured such that when electromagnetic radiation strikes the outer surface from a first direction, at least a portion of the electromagnetic radiation departs the outer surface in a second direction that is at an angle to the first direction to irradiate, in the interior volume of the feedstock line, the resin that, due at least in part to the elongate filaments, is not directly accessible to the electromagnetic radiation, incident on the exterior surface of the feedstock line.

Inclusion of optical direction modifiers in the feedstock line facilitates penetration of the electromagnetic radiation into the interior volume of the feedstock line for irradiation of the resin, despite regions of the resin being in the shadows of the elongate filaments cast by the direct (i.e., line-of-sight) application of the electromagnetic radiation. In other words, even when the electromagnetic radiation is shielded from directly reaching all regions of the resin, the optical direction modifiers will redirect the electromagnetic radiation to disperse or scatter the electromagnetic radiation to indirectly reach regions of the resin. As a result, the feedstock line may be more easily cured with the electromagnetic radiation, may be more evenly cured with the electromagnetic radiation, may be more thoroughly cured with the electromagnetic radiation, and/or may be more quickly cured with the electromagnetic radiation. This configuration of feedstock line is particularly well suited for additive manufacturing of the fused filament fabrication variety, in which the feedstock line is dispensed by a print head, or nozzle, and a source of curing energy (e.g., electromagnetic radiation) directs the curing energy at the feedstock line as it is being dispensed to cure the resin in situ.

Another example of the subject matter according to the invention relates to a system for creating a feedstock line for additive manufacturing of an object. The feedstock line has a feedstock-line length. The system comprises a filament supply, a filament separator, an optical-direction-modifier supply, a combiner, and a resin supply. The filament supply is configured to dispense a precursor tow, comprising elongate filaments. The filament separator is configured to separate the precursor tow, dispensed from the filament supply, into individual ones of the elongate filaments or into subsets of the elongate filaments. Each of the subsets comprises a plurality of the elongate filaments. The optical-direction-modifier supply is configured to dispense optical direction modifiers to be applied to the individual ones of the elongate filaments or the subsets of the elongate filaments, originating from the filament separator. Each of the optical direction modifiers has an outer surface, and each of the optical direction modifiers is configured such that when electromagnetic radiation strikes the outer surface from a first direction, at least a portion of the electromagnetic radiation departs the outer surface in a second direction that is at an angle to the first direction. The combiner is configured to combine the individual ones of the elongate filaments and the optical direction modifiers, dispensed by the optical-direction-modifier supply, or the subsets of the elongate filaments and the optical direction modifiers, dispensed by the optical-direction-modifier supply, into a derivative tow so that each of the elongate filaments and the optical direction modifiers are interspersed among the elongate filaments. The resin supply is configured to provide a resin to be applied to at least one of (i) the precursor tow, dispensed from the filament supply, (ii) the individual ones of the elongate filaments or the subsets of the elongate filaments, originating from the filament separator, (iii) the optical direction modifiers, dispensed from the optical-direction-modifier supply, or (iv) the derivative tow, originating from the combiner, such that the elongate filaments and the optical direction modifiers in the derivative tow are covered with the resin.

Creating the feedstock line from the precursor tow permits the use of off-the-shelf reinforcement fiber tows. The filament separator separates the precursor tow into individual ones of the elongate filaments or into subsets of the elongate filaments, so that the optical direction modifiers may be operatively interspersed with the elongate filaments. The combiner then combines the elongate filaments and the optical direction modifiers into the derivative tow to ultimately become the feedstock line with the resin. The resin supply dispenses the resin at any suitable location as the feedstock line is being created, including one or more of (i) at the precursor tow before it is separated, (ii) at the separated elongate filaments, (iii) at or with the optical direction modifiers before they are combined with the elongate filaments, or (iv) at the derivative tow after the optical direction modifiers have been combined with the elongate filaments.

Yet another example of the subject matter according to the invention relates to a method of creating a feedstock line for additive manufacturing of an object. The feedstock line has a feedstock-line length. The method comprises separating a precursor tow, comprising elongate filaments, into individual ones of the elongate filaments or into subsets of the elongate filaments. Each of the subsets comprises a plurality of the elongate filaments. The method also comprises applying optical direction modifiers to the individual ones of the elongate filaments or to the subsets of the elongate filaments. Each of the optical direction modifiers has an outer surface, and each of the optical direction modifiers is configured such that when electromagnetic radiation strikes the outer surface from a first direction, at least a portion of the electromagnetic radiation departs the outer surface in a second direction that is at an angle to the first direction. The method further comprises combining the optical direction modifiers with the individual ones of the elongate filaments or the subsets of the elongate filaments into a derivative tow so that the optical direction modifiers are interspersed among the elongate filaments. The method also comprises applying a resin to cover the elongate filaments and the optical direction modifiers such that the elongate filaments and the optical direction modifiers are covered by the resin in the derivative tow.

Creating the feedstock line from the precursor tow permits the use of off-the-shelf reinforcement fiber tows. By separating the precursor tow into individual ones of the elongate filaments or into subsets of the elongate filaments, the optical direction modifiers may be operatively interspersed with the elongate filaments. Covering the elongate filaments and the optical direction modifiers with the resin ensures that the elongate filaments and the optical direction modifiers are wetted and have suitable integrity for additively manufacturing the object.

BRIEF DESCRIPTION OF THE DRAWINGS

Figure 1:
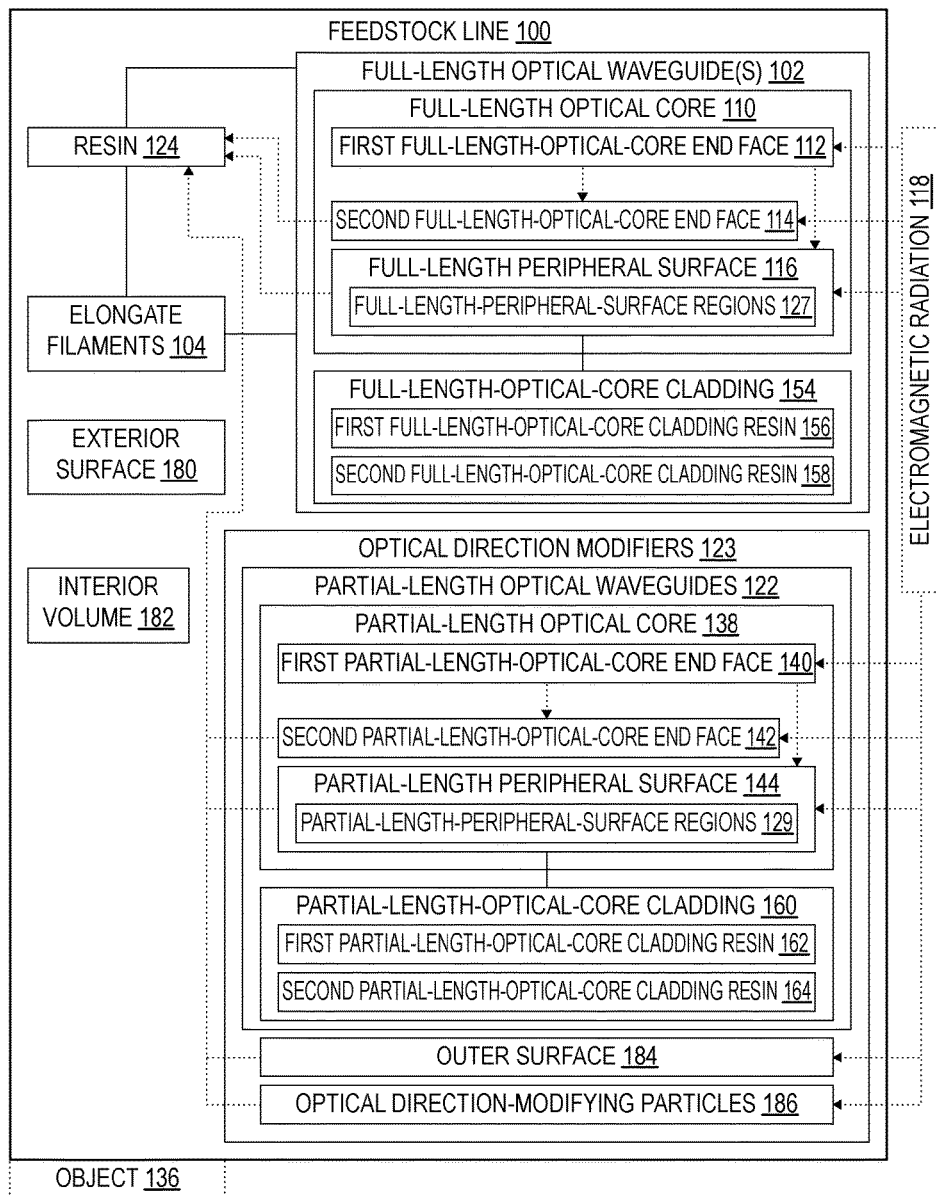
Figure 2:
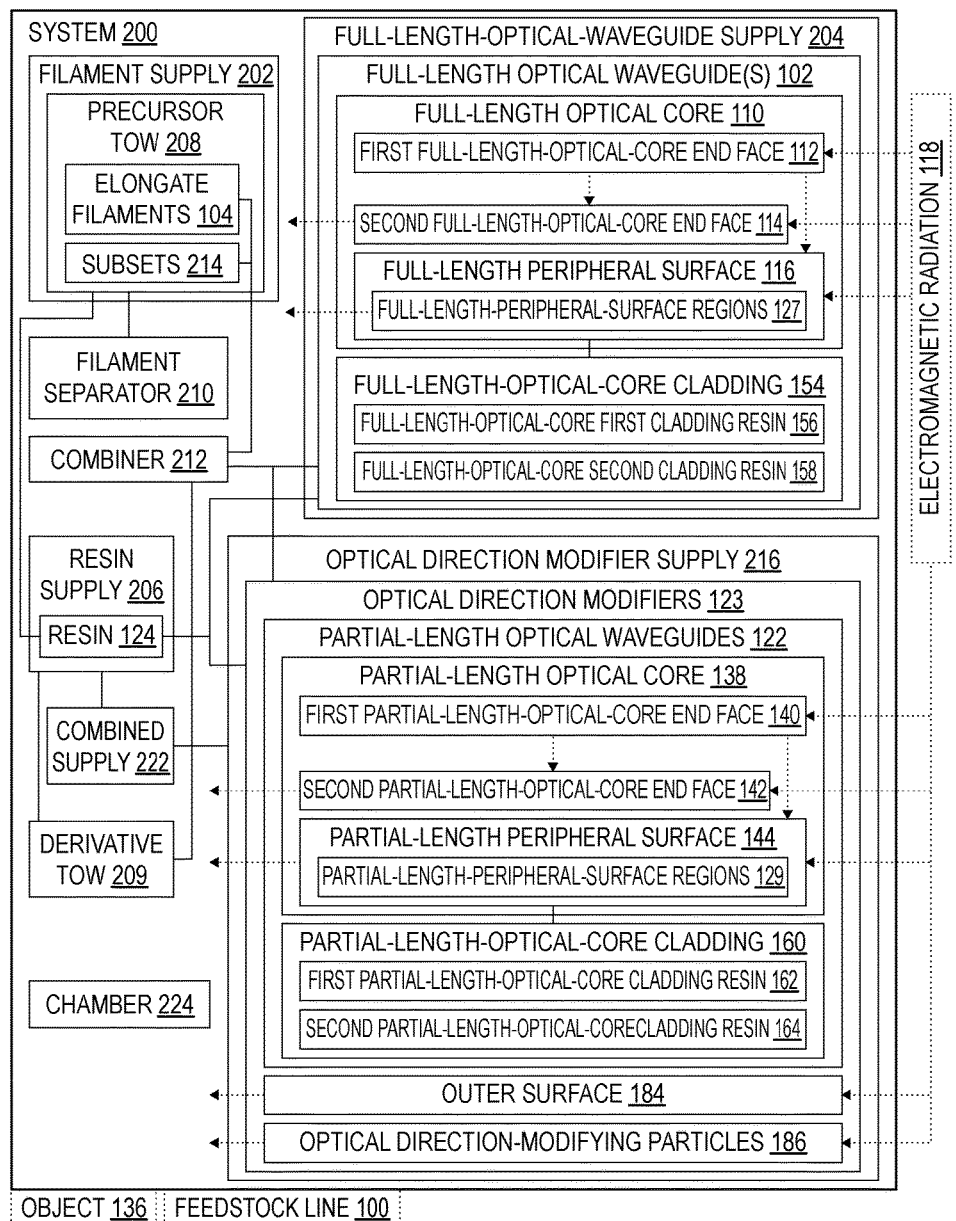
Figure 3:
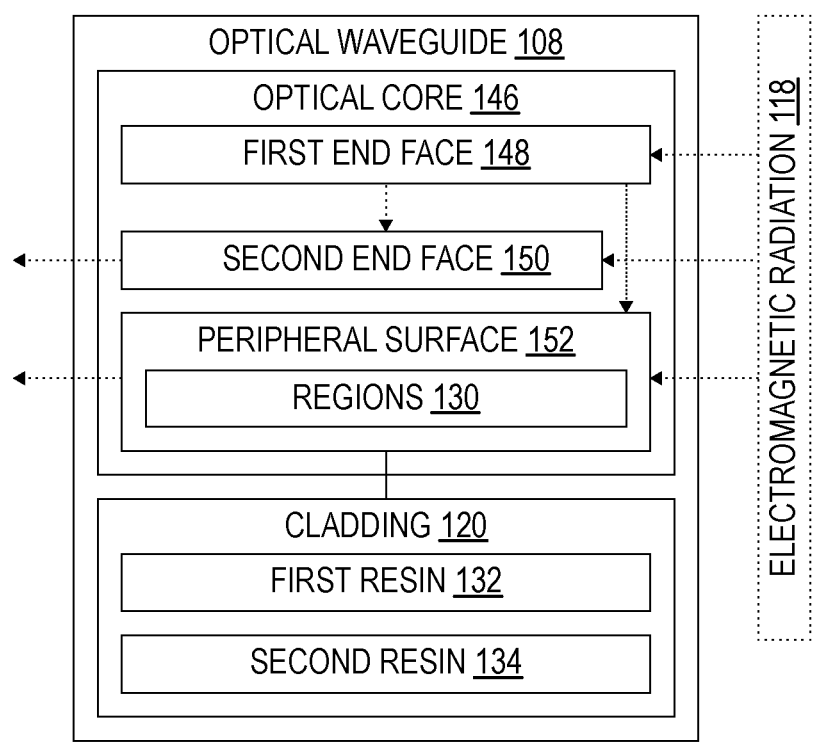
Figure 4:
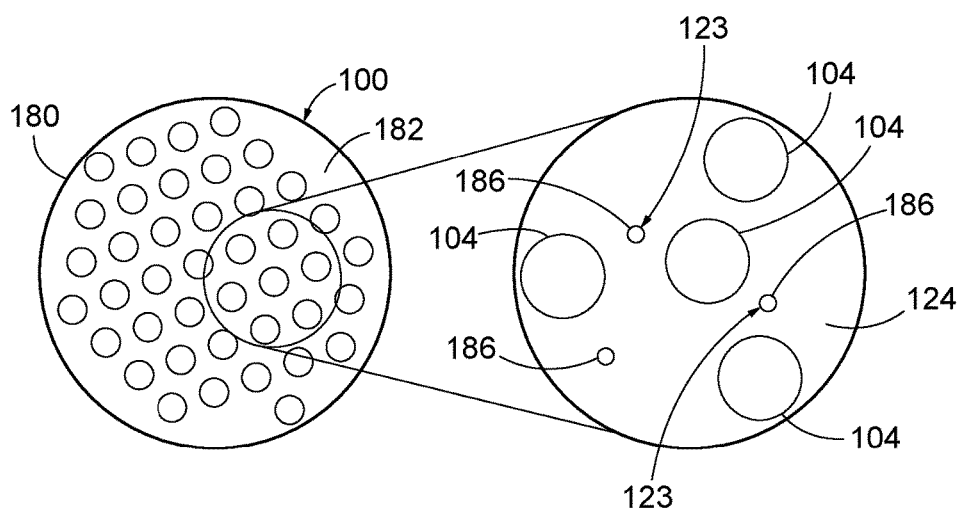
Figure 5:
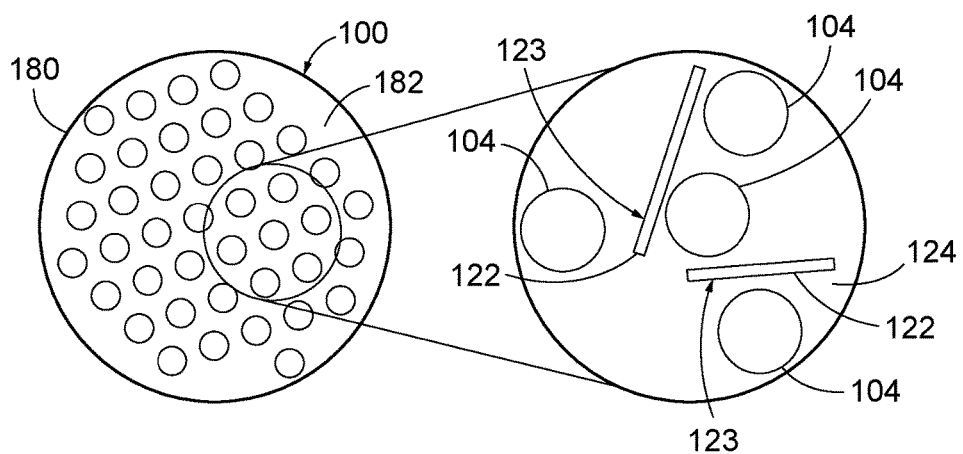
Figure 6:
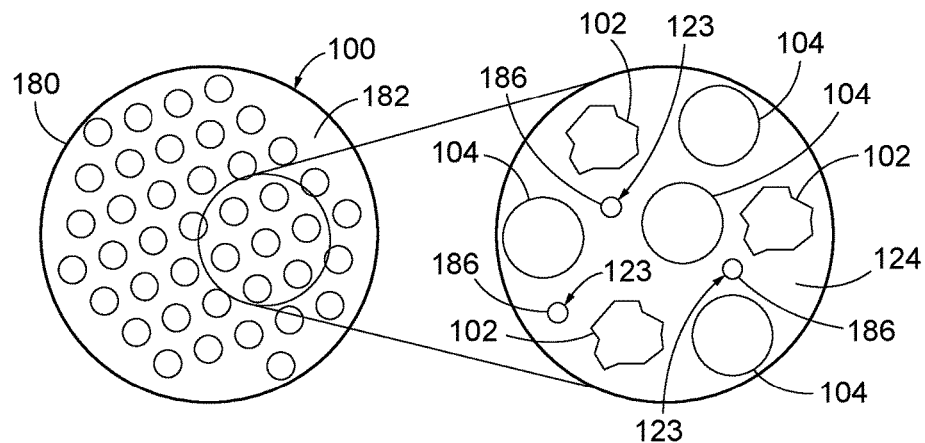
Figure 7:
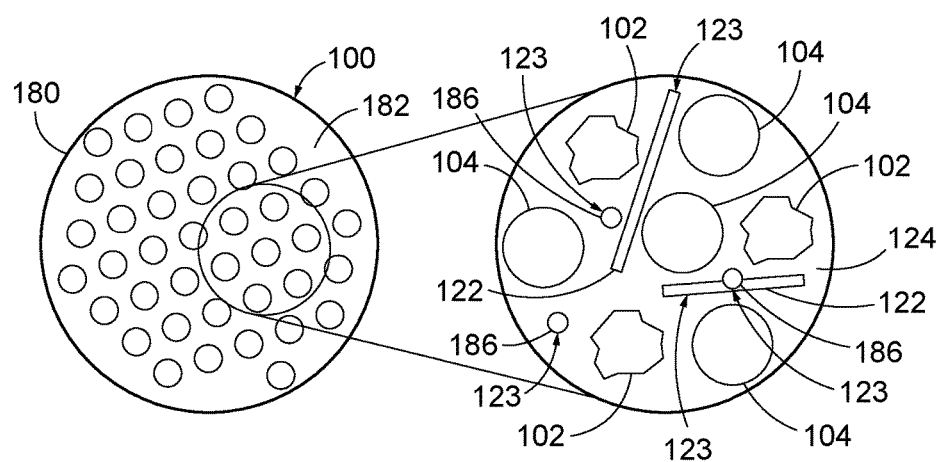
Figure 8:
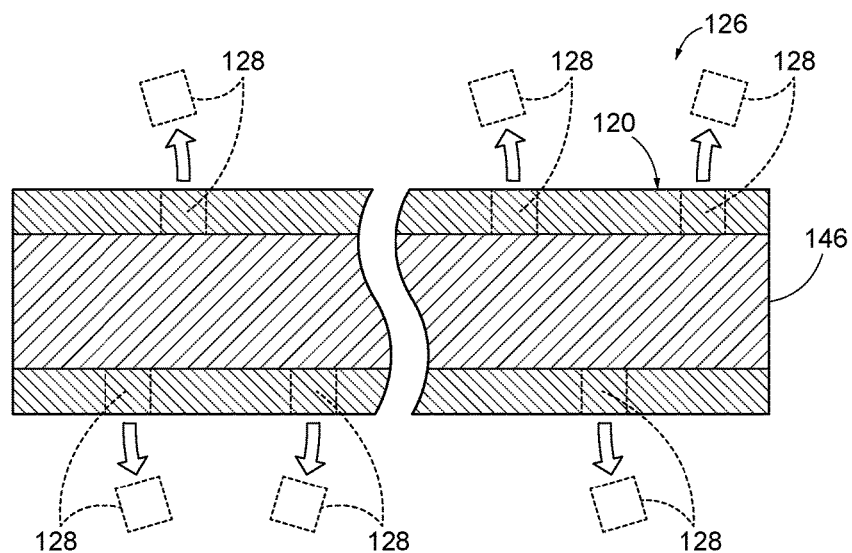
Figure 9:
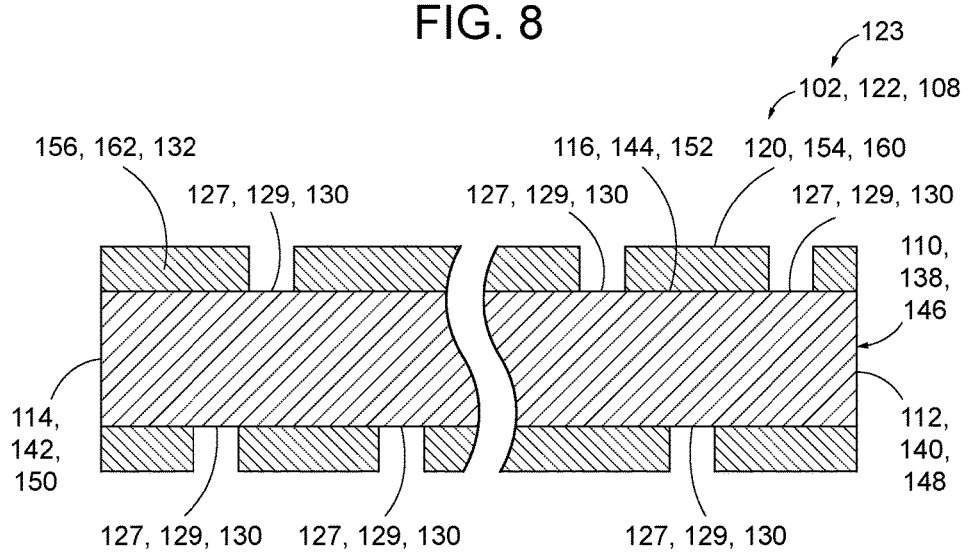
Figure 10:
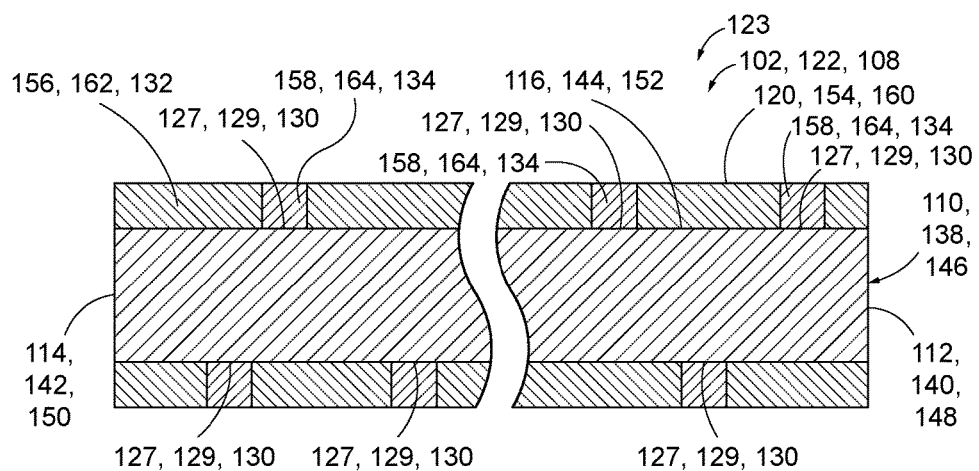
Figure 11:
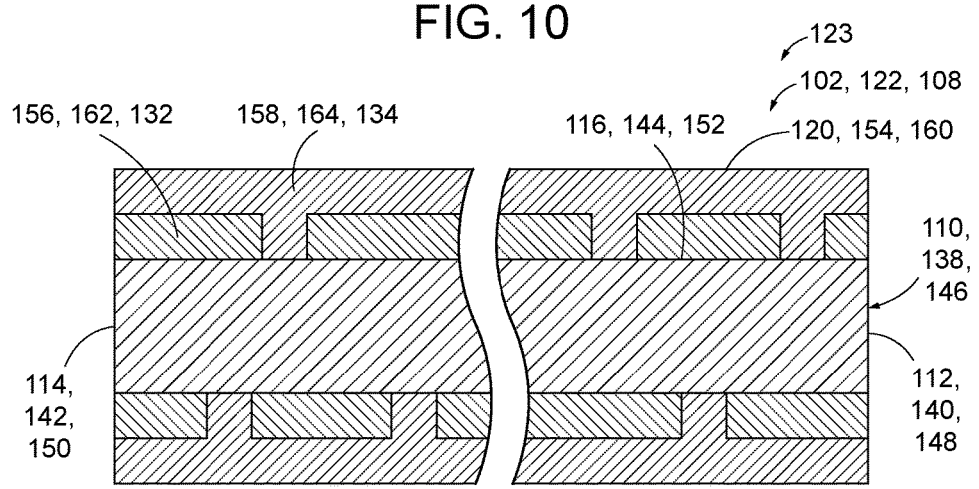
Figure 12:
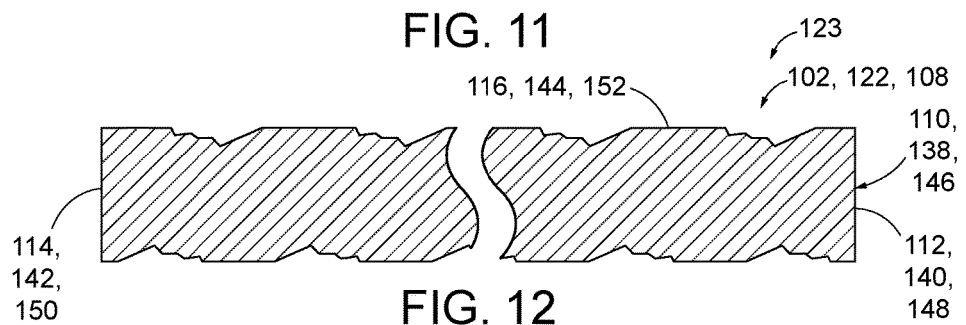
Figure 13:
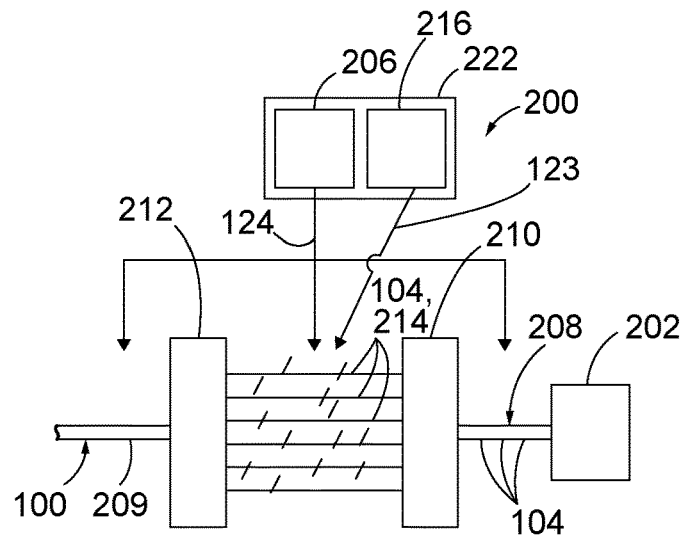
Figure 14:
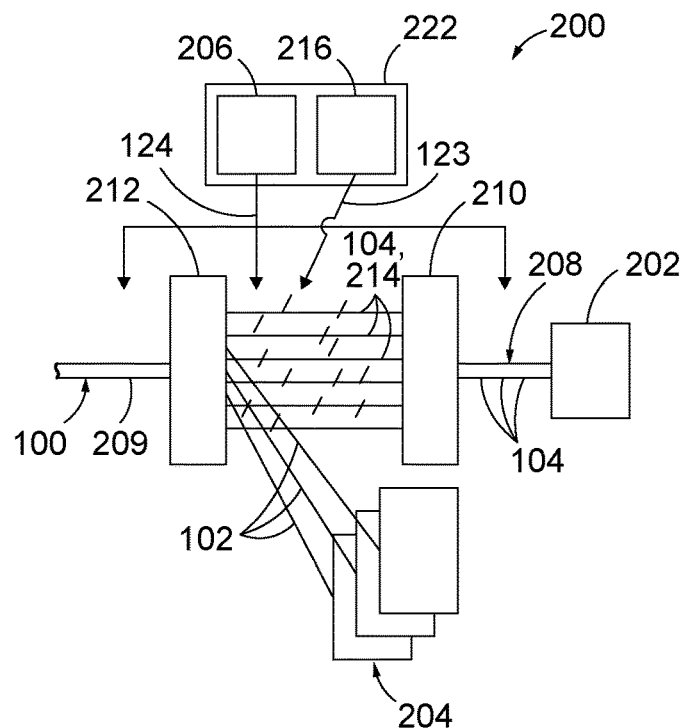
Figure 15:
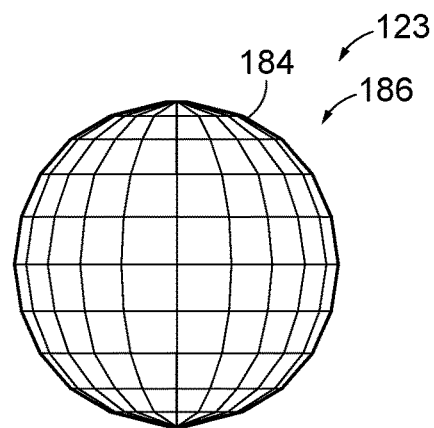
Figure 16:
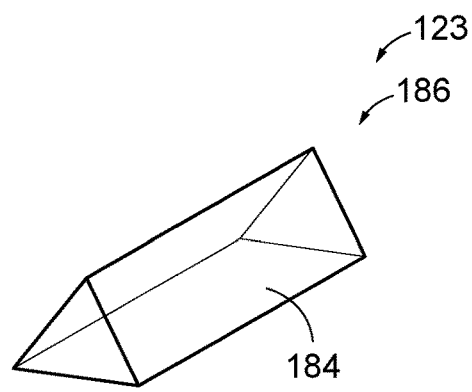
Figure 17:
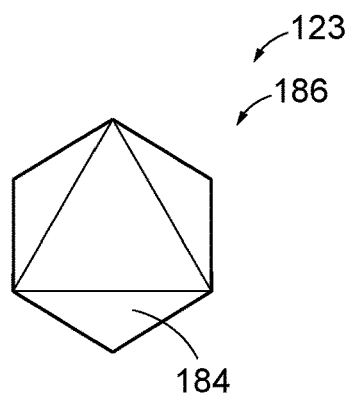
Figure 18:
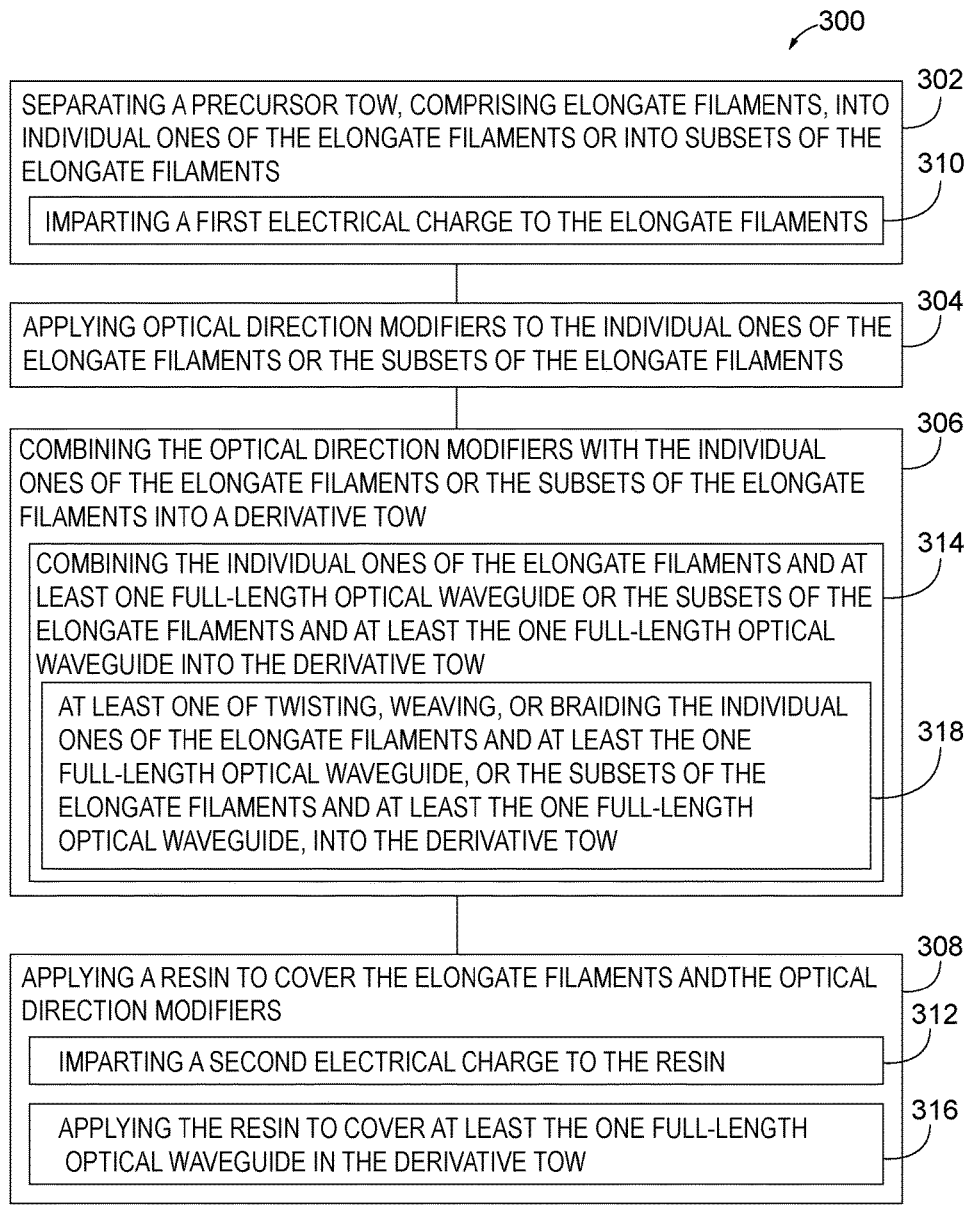
Figure 19:
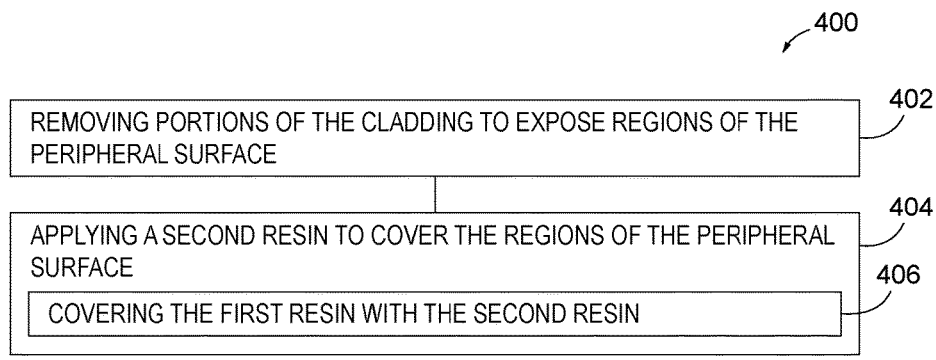
Figure 20:
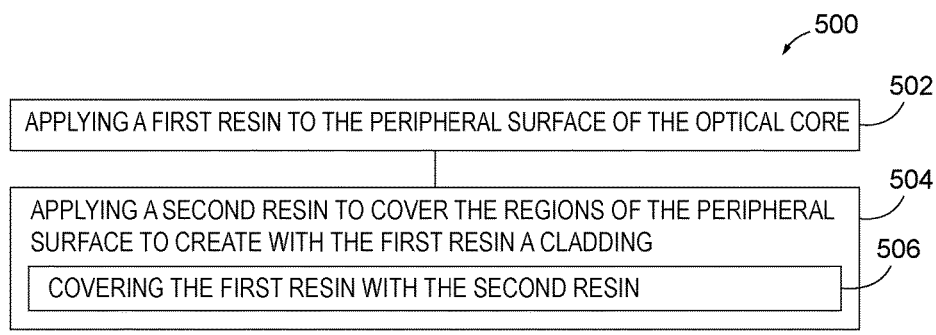
Figure 21:
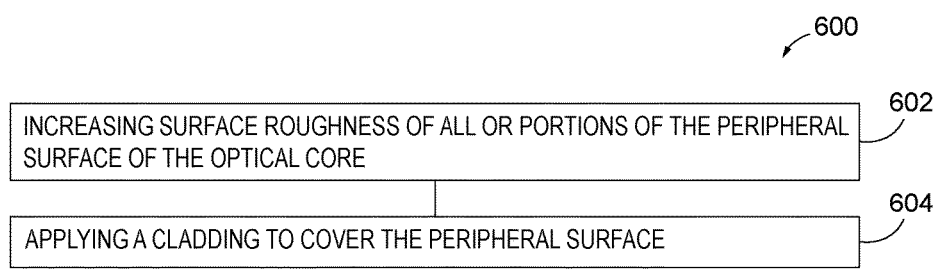
Figure 22:
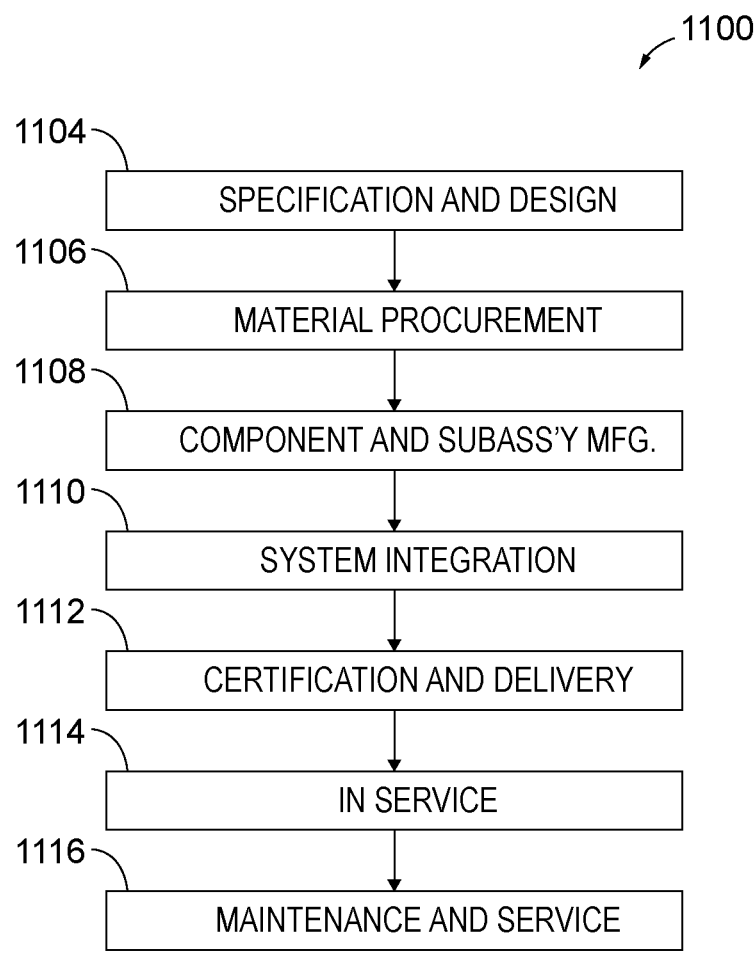
Figure 23:
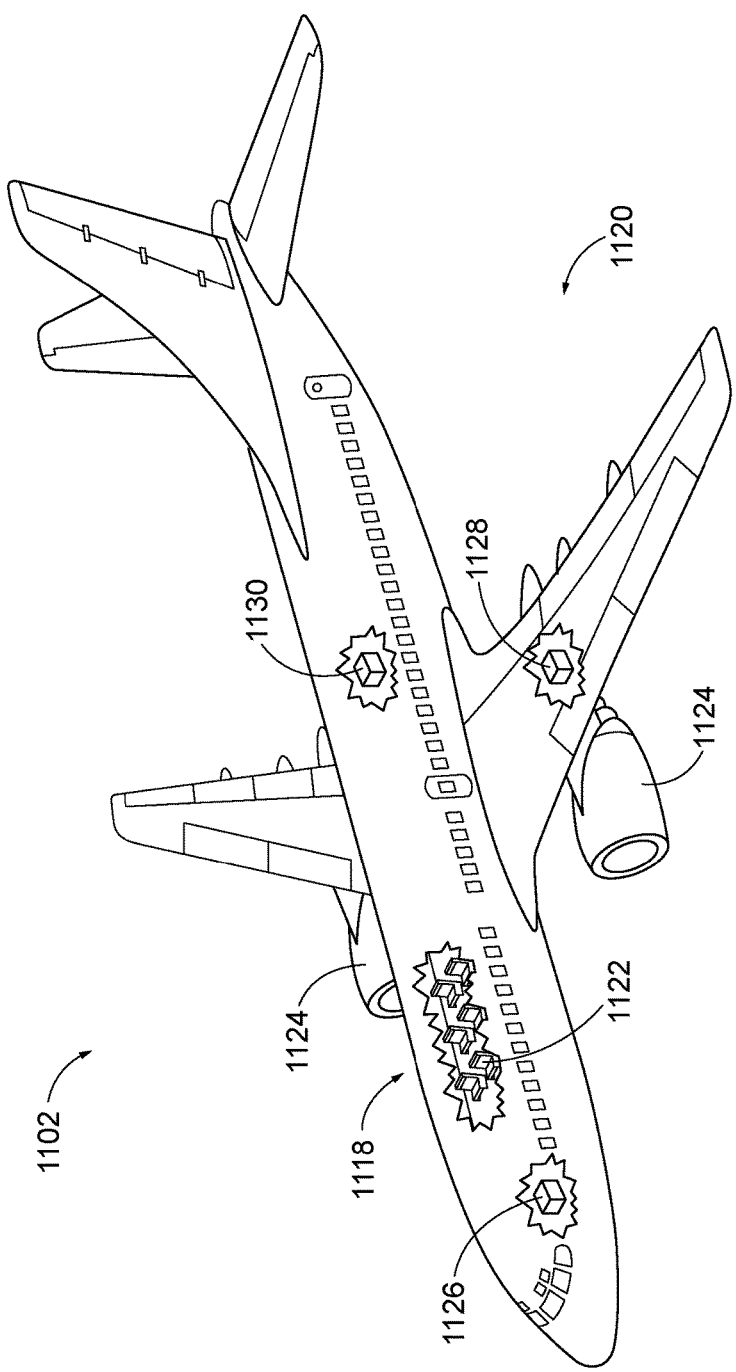

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram, schematically representing a feedstock line for additive manufacturing of an object, according to one or more examples of the present disclosure;

FIG. 2 is a block diagram, schematically representing a system for creating a feedstock line for additive manufacturing of an object, according to one or more examples of the present disclosure;

FIG. 3 is a block diagram, schematically representing an optical waveguide, according to one or more examples of the present disclosure;

FIG. 4 is a schematic representation of a feedstock line of FIG. 1, according to one or more examples of the present disclosure;

FIG. 5 is a schematic representation of a feedstock line of FIG. 1, according to one or more examples of the present disclosure;

FIG. 6 is a schematic representation of a feedstock line of FIG. 1, according to one or more examples of the present disclosure;

FIG. 7 is a schematic representation of a feedstock line of FIG. 1, according to one or more examples of the present disclosure;

FIG. 8 is a schematic representation of an optical fiber that may be modified to create an optical waveguide of FIG. 3, according to one or more examples of the present disclosure;

FIG. 9 is a schematic representation of an optical waveguide, according to one or more examples of the present disclosure;

FIG. 10 is a schematic representation of an optical waveguide, according to one or more examples of the present disclosure;

FIG. 11 is a schematic representation of an optical waveguide, according to one or more examples of the present disclosure;

FIG. 12 is a schematic representation of an optical waveguide, according to one or more examples of the present disclosure;

FIG. 13 is a schematic representation of a system of FIG. 2, according to one or more examples of the present disclosure;

FIG. 14 is a schematic representation of a system of FIG. 2, according to one or more examples of the present disclosure;

FIG. 15 is a schematic representation of an optical direction-modifying particle, according to one or more examples of the present disclosure;

FIG. 16 is a schematic representation of an optical direction-modifying particle, according to one or more examples of the present disclosure;

FIG. 17 is a schematic representation of an optical direction-modifying particle, according to one or more examples of the present disclosure;

FIG. 18 is a block diagram of a method of creating a feedstock line for additive manufacturing of an object, according to one or more examples of the present disclosure;

FIG. 19 is a block diagram of a method of modifying an optical fiber to create an optical waveguide, according to one or more examples of the present disclosure;

FIG. 20 is a block diagram of a method of modifying an optical fiber to create an optical waveguide, according to one or more examples of the present disclosure;

FIG. 21 is a block diagram of a method of modifying an optical fiber to create an optical waveguide, according to one or more examples of the present disclosure;

FIG. 22 is a block diagram of aircraft production and service methodology; and FIG. 23 is a schematic illustration of an aircraft.

DESCRIPTION

In FIGS. 1-3, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIGS. 1-3 may be combined in various ways without the need to include other features described in FIGS. 1-3, other drawing figures, and/or the accompanying disclosure, even though such combination or combinations are not explicitly illustrated herein. Similarly, additional features not limited to the examples presented, may be combined with some or all of the features shown and described herein.

In FIGS. 18-22, referred to above, the blocks may represent operations and/or portions thereof, and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 18-22 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item. Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 4-7, 9-12, and 15-17, feedstock line 100 for additive manufacturing of object 136 is disclosed. Feedstock line 100 has a feedstock-line length and exterior surface 180, defining interior volume 182 of feedstock line 100. Feedstock line 100 comprises elongate filaments 104, resin 124, and optical direction modifiers 123. Elongate filaments 104 extend along at least a portion of the feedstock-line length. Resin 124 covers elongate filaments 104. Optical direction modifiers 123 each extend along only a portion of the feedstock-line length. Optical direction modifiers 123 are covered by resin 124 and are interspersed among elongate filaments 104. Each of optical direction modifiers 123 has outer surface 184. Each of optical direction modifiers 123 is configured such that when electromagnetic radiation 118 strikes outer surface 184 from a first direction, at least a portion of electromagnetic radiation 118 departs outer surface 184 in a second direction that is at an angle to the first direction to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 1 of the present disclosure.

Inclusion of optical direction modifiers 123 in feedstock line 100 facilitates penetration of electromagnetic radiation 118 into interior volume 182 of feedstock line 100 for irradiation of resin 124, despite regions of resin 124 being in the shadows of elongate filaments 104 cast by the direct (i.e., line-of-sight) application of electromagnetic radiation 118. In other words, even when electromagnetic radiation 118 is shielded from directly reaching all regions of resin 124, optical direction modifiers 123 will redirect electromagnetic radiation 118 to disperse or scatter electromagnetic radiation 118 to indirectly reach regions of resin 124. As a result, feedstock line 100 may be more easily cured with electromagnetic radiation 118, may be more evenly cured with electromagnetic radiation 118, may be more thoroughly cured with electromagnetic radiation 118, and/or may be more quickly cured with electromagnetic radiation 118. This configuration of feedstock line 100 is particularly well suited for additive manufacturing of the fused filament fabrication variety, in which feedstock line 100 is dispensed by a print head, or nozzle, and a source of curing energy (e.g., electromagnetic radiation 118) directs the curing energy at feedstock line 100 as it is being dispensed to cure resin 124 in situ.

Elongate filaments 104 additionally or alternatively may be described as reinforcement filaments or fibers, and may be constructed of any suitable material, illustrative and non-exclusive examples of which include (but are not limited to) fibers, carbon fibers, glass fibers, synthetic organic fibers, aramid fibers, natural fibers, wood fibers, boron fibers, silicon-carbide fibers, optical fibers, fiber bundles, fiber tows, fiber weaves, wires, metal wires, conductive wires, and wire bundles. Feedstock line 100 may include a single configuration, or type, of elongate filaments 104 or may include more than one configuration, or type, of elongate filaments 104. In some examples, elongate filaments 104 may individually and collectively extend for the entire, or substantially the entire, feedstock-line length, and thus may be described as continuous elongate filaments or as full-length elongate filaments. Additionally or alternatively elongate filaments 104 may individually extend for only a portion of the feedstock-line length, and thus may be described as partial-length elongate filaments or non-continuous elongate filaments. Examples of partial-length elongate filaments include (but are not limited to) so-called chopped fibers.

Resin 124 may include any suitable material that is configured to be cured, or hardened, as a result of cross-linking of polymer chains, such as responsive to an application of electromagnetic radiation 118. For example, electromagnetic radiation 118, or curing energy, may comprise one or more of ultraviolet light, visible light, infrared light, x-rays, electron beams, and microwaves, and resin 124 may take the form of one or more of a polymer, a resin, a thermoplastic, a thermoset, a photopolymer, an ultra-violet photopolymer, a visible-light photopolymer, an infrared-light photopolymer, and an x-ray photopolymer. As used herein, a photopolymer is a polymer that is configured to be cured in the presence of light, such as one or more of ultra-violet light, visible-light, infrared-light, and x-rays. However, as discussed, inclusion of optical direction modifiers 123 in feedstock line 100 specifically facilitates the penetration of electromagnetic radiation 118 into the shadows of elongate filaments 104, and thus electromagnetic radiation 118 typically will be of a wavelength that does not penetrate elongate filaments 104, and resin 124 typically will be a photopolymer.

Referring generally to FIG. 1 and particularly to, e.g., FIGS. 4-7, elongate filaments 104 are opaque to electromagnetic radiation 118. The preceding subject matter of this paragraph characterizes example 2 of the present disclosure, wherein example 2 also includes the subject matter according to example 1, above.

Elongate filaments 104 typically will be selected for strength properties and not for light-transmissivity properties. For example, carbon fibers are often used in fiber-reinforced composite structures, and carbon fibers are opaque to ultra-violet and visible light. Accordingly, elongate filaments 104 that are opaque to electromagnetic radiation 118 are well suited for inclusion in feedstock line 100, as optical direction modifiers 123 operatively will disperse electromagnetic radiation 118 into the shadows of elongate filaments 104.

Referring generally to FIG. 1 and particularly to, e.g., FIGS. 5, 7, and 9-12, optical direction modifiers 123 comprise partial-length optical waveguides 122. Each of partial-length optical waveguides 122 comprises partial-length optical core 138. Partial-length optical core 138 of each of partial-length optical waveguides 122 comprises first partial-length-optical-core end face 140, second partial-length-optical-core end face 142, opposite first partial-length-optical-core end face 140, and partial-length peripheral surface 144, extending between first partial-length-optical-core end face 140 and second partial-length-optical-core end face 142. Each of partial-length optical waveguides 122 is configured such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 3 of the present disclosure, wherein example 3 also includes the subject matter according to example 1 or 2, above.

Partial-length optical waveguides 122 may be cost effective to create, such as according to the various methods disclosed herein. Moreover, by being interspersed among elongate filaments 104, partial-length optical waveguides 122 may directly receive electromagnetic radiation 118 and deliver electromagnetic radiation 118 into the shadows of elongate filaments 104.

Referring generally to FIG. 1 and particularly to, e.g., FIGS. 5, 7, and 9-12, feedstock line 100 is configured such that when electromagnetic radiation 118 enters interior volume 182 of feedstock line 100 via exterior surface 180 of feedstock line 100, electromagnetic radiation 118 enters at least one of partial-length optical waveguides 122 via at least one of partial-length peripheral surface 144, first partial-length-optical-core end face 140, or second partial-length-optical-core end face 142 of at least one of partial-length optical waveguides 122. The preceding subject matter of this paragraph characterizes example 4 of the present disclosure, wherein example 4 also includes the subject matter according to example 3, above.

In other words, in some examples of feedstock line 100, partial-length optical waveguides 122 are positioned within interior volume 182 of feedstock line 100 such that at least one of partial-length peripheral surface 144, first partial-length-optical-core end face 140, or second partial-length-optical-core end face 142 is within the line of sight of electromagnetic radiation 118 to receive electromagnetic radiation 118 directed to exterior surface 180 of feedstock line 100 and then disperse, or scatter, electromagnetic radiation 118 within interior volume 182.

Referring generally to FIG. 1 and particularly to, e.g., FIGS. 9-11, partial-length optical core 138 has a partial-length-optical-core refractive index. Each of partial-length optical waveguides 122 further comprises partial-length-optical-core cladding 160, at least partially covering partial-length optical core 138. Partial-length-optical-core cladding 160 comprises at least first partial-length-optical-core cladding resin 162, having a partial-length-optical-core first-cladding-resin refractive index. Partial-length-optical-core cladding 160 is non-uniform along each of partial-length optical waveguides 122. The partial-length-optical-core refractive index is greater than the partial-length-optical-core first-cladding-resin refractive index. The preceding subject matter of this paragraph characterizes example 5 of the present disclosure, wherein example 5 also includes the subject matter according to example 3 or 4, above.

By being non-uniform along the length of partial-length optical waveguides 122, electromagnetic radiation 118 is permitted to exit partial-length optical core 138 via partial-length peripheral surface 144. Moreover, by first partial-length-optical-core cladding resin 162 having a refractive index that is less than that of partial-length optical core 138, electromagnetic radiation 118, upon entering partial-length optical core 138, is trapped within partial-length optical core 138 other than the regions where first partial-length-optical-core cladding resin 162 is not present. As a result, partial-length optical waveguides 122 may be constructed to provide a desired amount of electromagnetic radiation 118, exiting various positions along partial-length peripheral surface 144, such as to ensure a desired amount of electromagnetic radiation 118, penetrating the shadows of elongate filaments 104.

Referring generally to FIG. 1 and particularly to, e.g., FIGS. 10 and 11, partial-length peripheral surface 144 of partial-length optical core 138 of each of partial-length optical waveguides 122 has partial-length-peripheral-surface regions 129 devoid of first partial-length-optical-core cladding resin 162. Partial-length-optical-core cladding 160 further comprises second partial-length-optical-core cladding resin 164, having a partial-length-optical-core second-cladding-resin refractive index. Second partial-length-optical-core cladding resin 164 covers partial-length-peripheral-surface regions 129 of partial-length peripheral surface 144. The partial-length-optical-core second-cladding-resin refractive index is greater than the partial-length-optical-core first-cladding-resin refractive index. The preceding subject matter of this paragraph characterizes example 6 of the present disclosure, wherein example 6 also includes the subject matter according to example 5, above.

By covering partial-length-peripheral-surface regions 129 with second partial-length-optical-core cladding resin 164, a desired refractive index thereof may be selected to optimize how electromagnetic radiation 118 exits partial-length peripheral surface 144. Additionally or alternatively, with partial-length-peripheral-surface regions 129 covered with second partial-length-optical-core cladding resin 164, the integrity of first partial-length-optical-core cladding resin 162 may be ensured, such that it does not peel or break off during storage of partial-length optical waveguides 122 and during construction of feedstock line 100.

Referring generally to FIG. 1 and particularly to, e.g., FIG. 11, second partial-length-optical-core cladding resin 164 also covers first partial-length-optical-core cladding resin 162. The preceding subject matter of this paragraph characterizes example 7 of the present disclosure, wherein example 7 also includes the subject matter according to example 6, above.

Partial-length optical waveguides 122 according to example 7 may be more easily manufactured, in that partial-length optical core 138 with first partial-length-optical-core cladding resin 162 simply may be fully coated with second partial-length-optical-core cladding resin 164. Additionally or alternatively, the integrity of partial-length optical waveguides 122 may be maintained during storage thereof and during construction of feedstock line 100.

Referring generally to FIG. 1 and particularly to, e.g., FIGS. 10 and 11, resin 124 has a resin refractive index. The resin refractive index is greater than the partial-length-optical-core second-cladding-resin refractive index. The preceding subject matter of this paragraph characterizes example 8 of the present disclosure, wherein example 8 also includes the subject matter according to example 6 or 7, above.

Because second partial-length-optical-core cladding resin 164 has a refractive index less than that of resin 124, electromagnetic radiation 118 will be permitted to exit second partial-length-optical-core cladding resin 164 to penetrate and cure resin 124 when feedstock line 100 is being used to additively manufacture object 136.

Referring generally to FIG. 1 and particularly to, e.g., FIG. 12, partial-length peripheral surface 144 of partial-length optical core 138 of each of partial-length optical waveguides 122 has a surface roughness that is selected such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 9 of the present disclosure, wherein example 9 also includes the subject matter according to example 3 or 4, above.

Rather than relying on refractive-index properties of a cladding to ensure desired dispersal of electromagnetic radiation 118 from partial-length optical core 138 via partial-length peripheral surface 144, the surface roughness of partial-length peripheral surface 144 is selected such that electromagnetic radiation 118 exits partial-length optical core 138 at desired amounts along the length of partial-length peripheral surface 144. For example, the surface roughness may create regions of internal reflection of electromagnetic radiation 118 within partial-length optical core 138 and may create regions where electromagnetic radiation 118 is permitted to escape partial-length optical core 138.

Referring generally to FIG. 1 and particularly to, e.g., FIG. 12, each of partial-length optical waveguides 122 is devoid of any cladding that covers partial-length optical core 138. The preceding subject matter of this paragraph characterizes example 10 of the present disclosure, wherein example 10 also includes the subject matter according to example 9, above.

Partial-length optical waveguides 122 without any cladding may be less expensive to manufacture than partial-length optical waveguides 122 with cladding. Additionally, the difference of refractive indexes between a cladding and resin 124 need not be taken into account when selecting resin 124 for feedstock line 100.

Referring generally to FIG. 1 and particularly to, e.g., FIGS. 4, 6, 7, and 15-17, optical direction modifiers 123 comprise optical direction-modifying particles 186. Optical direction-modifying particles 186 are configured to at least one of reflect, refract, diffract, or Rayleigh-scatter electromagnetic radiation 118, incident on outer surface 184 of any one of optical direction-modifying particles 186, to disperse, in interior volume 182 of feedstock line 100, electromagnetic radiation 118 to irradiate resin 124 that, due at least in part to elongate filaments 104, is not directly accessible to electromagnetic radiation 118, incident on exterior surface 180 of feedstock line 100. The preceding subject matter of this paragraph characterizes example 11 of the present disclosure, wherein example 11 also includes the subject matter according to any one of examples 1 to 10, above.

Inclusion of optical direction-modifying particles 186 that at least one of reflect, refract, diffract, or Rayleigh-scatter electromagnetic radiation 118 provides for dispersion of electromagnetic radiation 118 within interior volume 182 for irradiation of resin 124 therein. Moreover, because they are particles, optical direction-modifying particles 186 more easily are positioned among elongate filaments 104 of a bundle, or tow, of elongate filaments 104. In addition, in some examples, they may be generally uniformly spaced throughout resin 124 within interior volume 182 and effectively scatter electromagnetic radiation 118 throughout interior volume 182 to penetrate among elongate filaments 104 and into the shadows cast by elongate filaments 104 when feedstock line 100 is being used to additively manufacture object 136. In other examples, optical direction-modifying particles 186 may have a gradient of concentration within interior volume 182.

Optical direction-modifying particles 186 may be of any suitable material, such that they reflect, refract, diffract, or Rayleigh-scatter electromagnetic radiation 118. As illustrative, non-exclusive examples, optical direction-modifying particles 186 may be of alumina, silica, or thermoplastic with desired reflective, refractive, diffractive, or Rayleigh-scattering properties in connection with electromagnetic radiation 118.

In some examples of feedstock line 100, a single type, or configuration, of optical direction-modifying particles 186 may be included. In other examples of feedstock line 100, more than one type, or configuration, of optical direction-modifying particles 186 may be included, with different types being selected to accomplish different functions, and ultimately to collectively scatter electromagnetic radiation 118 evenly throughout interior volume 182, including into the shadows of elongate filaments 104. For example, a first type of optical direction-modifying particles 186 may be configured to reflect electromagnetic radiation 118, a second type of optical direction-modifying particles 186 may be configured to refract electromagnetic radiation 118, and a third type of optical direction-modifying particles 186 may be configured to diffract electromagnetic radiation 118.

Referring generally to FIG. 1 and particularly to, e.g., FIGS. 4, 6, and 7, each of elongate filaments 104 has a minimum outer dimension. Each of optical direction-modifying particles 186 has a maximum outer dimension that is less than one-eighth the minimum outer dimension of any one of elongate filaments 104. The preceding subject matter of this paragraph characterizes example 12 of the present disclosure, wherein example 12 also includes the subject matter according to example 11, above.

By having a maximum outer dimension that is less than one-eighth the minimum outer dimension of elongate filaments 104, optical direction-modifying particles 186 easily extend among elongate filaments 104. Moreover, when feedstock line 100 is being constructed (e.g., by system 200 herein or according to method 300 herein), optical direction-modifying particles 186 may easily flow with resin 124 into a bundle, or tow, of elongate filaments 104.

Referring generally to FIG. 1 and particularly to, e.g., FIGS. 4, 6, 7, and 15-17, each of optical direction-modifying particles 186 has a maximum outer dimension that is less than 1000 nm, 500 nm, 250 nm, or 200 nm. The preceding subject matter of this paragraph characterizes example 13 of the present disclosure, wherein example 13 also includes the subject matter according to example 11 or 12, above.

Typical reinforcement fibers for composite materials often have a diameter in the range of 5 to 8 microns. By having a maximum outer dimension that is less than 1000 nm (1 micron), 500 nm (0.5 micron), 250 nm (0.25 micron), or 200 nm (0.200 micron), optical direction-modifying particles 186 easily extend between typical sizes of elongate filaments 104. Moreover, when feedstock line 100 is being constructed (e.g., by system 200 herein or according to method 300 herein), optical direction-modifying particles 186 may easily flow with resin 124 into a bundle, or tow, of elongate filaments 104.

Referring generally to FIG. 1 and particularly to, e.g., FIGS. 4, 6, 7, and 15-17, electromagnetic radiation 118 has a wavelength. Each of optical direction-modifying particles 186 has a minimum outer dimension that is greater than one-fourth the wavelength of electromagnetic radiation 118. The preceding subject matter of this paragraph characterizes example 14 of the present disclosure, wherein example 14 also includes the subject matter according to any one of examples 11 to 13, above.

Selecting a minimum outer dimension of optical direction-modifying particles 186 that is greater than one-fourth the wavelength of electromagnetic radiation 118 ensures that optical direction-modifying particles 186 will have the intended effect of causing electromagnetic radiation 118 to reflect, refract, or diffract upon hitting optical direction-modifying particles 186.

Referring generally to FIG. 1 and particularly to, e.g., FIGS. 4, 6, 7, and 15-17, each of optical direction-modifying particles 186 has a minimum outer dimension that is greater than or equal to 50 nm or that is greater than or equal to 100 nm. The preceding subject matter of this paragraph characterizes example 15 of the present disclosure, wherein example 15 also includes the subject matter according to any one of examples 11 to 14, above.

Ultra-violet light having a wavelength of about 400 nm is often used in connection with ultra-violet photopolymers. Accordingly, when resin 124 comprises or consists of a photopolymer, optical direction-modifying particles 186 having a minimum outer dimension that is greater than or equal to 100 nm ensures that optical direction-modifying particles 186 will have the intended effect of causing electromagnetic radiation 118 to reflect, refract, or diffract upon hitting optical direction-modifying particles 186. However, in other examples, a minimum outer dimension as low as 50 nm may be appropriate.

Referring generally to FIG. 1 and particularly to, e.g., FIGS. 4, 6, and 7, optical direction-modifying particles 186 comprise less than 10% by weight of resin 124, less than 5% by weigh of resin 124$t$, or less than 1% by weight of resin 124 of feedstock line 100. The preceding subject matter of this paragraph characterizes example 16 of the present disclosure, wherein example 16 also includes the subject matter according to any one of examples 11 to 15, above.

By limiting optical direction-modifying particles 186 to the referenced threshold percentages, resin 124 will operatively flow among elongate filaments 104 when feedstock line 100 is being constructed (e.g., by system 200 herein or according to method 300 herein). In addition, desired properties of resin 124, feedstock line 100, and ultimately object 136 will not be negatively impacted by the presence of optical direction-modifying particles 186.

Referring generally to FIG. 1 and particularly to, e.g., FIGS. 15-17, outer surfaces 184 of at least some of optical direction-modifying particles 186 are faceted. The preceding subject matter of this paragraph characterizes example 17 of the present disclosure, wherein example 17 also includes the subject matter according to any one of examples 11 to 16, above.

By being faceted, outer surfaces 184 effectively scatter electromagnetic radiation 118.

As used herein, "faceted" means having a plurality of planar, or generally planar, surfaces. In some examples of optical direction-modifying particles 186 that are faceted, outer surface 184 may have six or more, eight or more, ten or more, 100 or more, or even 1000 or more generally planar surfaces. Optical direction-modifying particles 186 may be of a material that has a natural crystalline structure that is faceted.

Referring generally to FIG. 1 and particularly to, e.g., FIGS. 15-17, outer surfaces 184 of at least some of optical direction-modifying particles 186 have a surface roughness that is selected such that when electromagnetic radiation 118 strikes outer surfaces 184, electromagnetic radiation 118 is scattered in interior volume 182 of feedstock line 100 to irradiate resin 124 that, due at least in part to elongate filaments 104, is not directly accessible to electromagnetic radiation 118, incident on exterior surface 180 of feedstock line 100. The preceding subject matter of this paragraph characterizes example 18 of the present disclosure, wherein example 18 also includes the subject matter according to any one of examples 11 to 17, above.

Having a surface roughness selected to scatter electromagnetic radiation 118 facilitates the operative irradiation of resin 124 throughout interior volume 182, including into the shadows of elongate filaments 104.

Referring generally to FIG. 1 and particularly to, e.g., FIGS. 4, 6, and 7, resin 124 has a resin refractive index. At least some of optical direction-modifying particles 186 have a particle refractive index. The particle refractive index is greater than or less than the resin refractive index. The preceding subject matter of this paragraph characterizes example 19 of the present disclosure, wherein example 19 also includes the subject matter according to any one of examples 11 to 18, above.

When optical direction-modifying particles 186 have a refractive index that is different from (e.g., that is at least 0.001 greater or less than) the refractive index of resin 124, electromagnetic radiation 118 incident upon the outer surfaces thereof will necessarily leave the outer surfaces at a different angle, and thus will scatter throughout resin 124, including into the shadows of elongate filaments 104.

Referring generally to FIG. 1 and particularly to, e.g., FIG. 15, at least some of optical direction-modifying particles 186 are spherical. The preceding subject matter of this paragraph characterizes example 20 of the present disclosure, wherein example 20 also includes the subject matter according to any one of examples 11 to 19, above.

By being spherical, optical direction-modifying particles 186 may easily be positioned among elongate filaments 104, and when feedstock line 100 is being constructed (e.g., by system 200 herein or according to method 300 herein), may easily flow with resin 124 into a bundle, or tow, of elongate filaments 104.

As used herein, "spherical" includes generally spherical and means that such optical direction-modifying particles 186 have a generally uniform aspect ratio, but are not necessarily perfectly spherical. For example, optical direction-modifying particles 186 that are spherical may be faceted, as discussed herein.

Referring generally to FIG. 1 and particularly to, e.g., FIG. 16, at least some of optical direction-modifying particles 186 are prismatic. The preceding subject matter of this paragraph characterizes example 21 of the present disclosure, wherein example 21 also includes the subject matter according to any one of examples 11 to 20, above.

By being prismatic, optical direction-modifying particles 186 may be selected to operatively at least one of reflect, refract, or diffract electromagnetic radiation 118, as discussed herein.

Referring generally to FIG. 1 and particularly to, e.g., FIGS. 5, 7, and 9-12, feedstock line 100 further comprises at least one full-length optical waveguide 102, extending along all of the feedstock-line length. At least one full-length optical waveguide 102 is covered by resin 124 and is interspersed among elongate filaments 104. At least one full-length optical waveguide 102 comprises full-length optical core 110. Full-length optical core 110 comprises first full-length-optical-core end face 112, second full-length-optical-core end face 114, opposite first full-length-optical-core end face 112, and full-length peripheral surface 116 extending between first full-length-optical-core end face 112 and second full-length-optical-core end face 114. At least one full-length optical waveguide 102 is configured such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 22 of the present disclosure, wherein example 22 also includes the subject matter according to any one of examples 1 to 21, above.

Inclusion of at least one full-length optical waveguide 102 in feedstock line 100 further facilitates penetration of electromagnetic radiation 118 into interior volume 182 of feedstock line 100 for irradiation of resin 124, despite regions of resin 124 being in the shadows of elongate filaments 104 cast by the direct (i.e., line-of-sight) application of electromagnetic radiation 118. In other words, even when electromagnetic radiation 118 is shielded from directly reaching all regions of resin 124, at least one full-length optical waveguide 102 may receive electromagnetic radiation 118 via one or more of its first full-length-optical-core end face 112, its second full-length-optical-core end face 114, or its full-length peripheral surface 116, and disperse electromagnetic radiation 118 via at least its full-length peripheral surface 116 to indirectly reach regions of resin 124. Not only may at least one full-length optical waveguide 102 serve to disperse electromagnetic radiation 118 into the shadows of elongate filaments 104, it also may serve to redirect electromagnetic radiation 118 to optical direction modifiers 123 for penetration into the shadows of elongate filaments 104 by at least one full-length optical waveguide 102. Additionally or alternatively, optical direction modifiers 123 may serve to redirect electromagnetic radiation 118 to at least one full-length optical waveguide 102 for penetration into the shadows of elongate filaments 104 by at least one full-length optical waveguide 102.

Referring generally to FIG. 1 and particularly to, e.g., FIGS. 5, 7, feedstock line 100 is configured such that when electromagnetic radiation 118 enters interior volume 182 of feedstock line 100 via exterior surface 180 of feedstock line 100, electromagnetic radiation 118 enters at least one full-length optical waveguide 102 via at least one of full-length peripheral surface 116, first full-length-optical-core end face 112, or second full-length-optical-core end face 114 of full-length optical core 110 of at least one full-length optical waveguide 102. The preceding subject matter of this paragraph characterizes example 23 of the present disclosure, wherein example 23 also includes the subject matter according to example 22, above.

In other words, in some examples of feedstock line 100, at least one full-length optical waveguide 102 is positioned within interior volume 182 of feedstock line 100 such that at least one of full-length peripheral surface 116, first full-length-optical-core end face 112, or second full-length-optical-core end face 114 is within the line of sight of electromagnetic radiation 118 to receive electromagnetic radiation 118 directed to exterior surface 180 of feedstock line 100 and then disperse electromagnetic radiation 118 into the shadows of elongate filaments 104. For example, at least one of full-length peripheral surface 116, first full-lengthoptical-core end face 112, or second full-length-optical-core end face 114 may be adjacent to exterior surface 180 of feedstock line 100.

Referring generally to FIG. 1 and particularly to, e.g., FIGS. 5, 7, and 9-12, at least one full-length optical waveguide 102 is configured such that when electromagnetic radiation 118 enters first full-length-optical-core end face 112 of full-length optical core 110, an initial portion of electromagnetic radiation 118 exits full-length optical core 110 via full-length peripheral surface 116 and a final portion of electromagnetic radiation 118, remaining in full-length optical core 110 after the initial portion of electromagnetic radiation 118 exits full-length optical core 110, exits full-length optical core 110 via second full-length-optical-core end face 114. The preceding subject matter of this paragraph characterizes example 24 of the present disclosure, wherein example 24 also includes the subject matter according to example 22 or 23, above.

In other words, in some examples of feedstock line 100, if electromagnetic radiation 118 enters first full-length-optical-core end face 112, it will exit both full-length peripheral surface 116 and second full-length-optical-core end face 114, as opposed, for example, to electromagnetic radiation 118 being fully emitted via full-length peripheral surface 116. Such examples of feedstock line 100 are well suited for additive manufacturing systems and methods in which electromagnetic radiation 118 is directed at first full-length-optical-core end face 112 as feedstock line 100 is being constructed and as object 136 is being manufactured. That is, an additive manufacturing system may be configured to construct feedstock line 100 while object 136 is being manufactured from feedstock line 100, and while electromagnetic radiation 118 is entering first full-length-optical-core end face 112. Because electromagnetic radiation 118 exits not only full-length peripheral surface 116, but also second full-length-optical-core end face 114, it is ensured that sufficient electromagnetic radiation 118 travels the full length of at least one full-length optical waveguide 102 to operatively cure resin 124 among elongate filaments 104 within interior volume 182 of feedstock line 100.

Referring generally to FIG. 1 and particularly to, e.g., FIGS. 5, 7, and 9-12, at least one full-length optical waveguide 102 is configured such that the initial portion of electromagnetic radiation 118, which exits full-length optical core 110 via full-length peripheral surface 116, is greater than or equal to the final portion of electromagnetic radiation 118, which exits full-length optical core 110 via second full-length-optical-core end face 114. The preceding subject matter of this paragraph characterizes example 25 of the present disclosure, wherein example 25 also includes the subject matter according to example 24, above.

In such configurations, it is ensured that a desired amount of electromagnetic radiation 118 exits full-length optical core 110 via full-length peripheral surface 116 to operatively cure resin 124 among elongate filaments 104 within interior volume 182 of feedstock line 100, when feedstock line 100 is utilized by an additive manufacturing system or in an additive manufacturing method.

Referring generally to FIG. 1 and particularly to, e.g., FIGS. 5 and 7, at least one full-length optical waveguide 102 is at least one of parallel to, generally parallel to, twisted with, woven with, or braided with elongate filaments 104. The preceding subject matter of this paragraph characterizes example 26 of the present disclosure, wherein example 26 also includes the subject matter according to any one of examples 22 to 25, above.

By at least one full-length optical waveguide 102 being generally parallel to elongate filaments 104, the reinforcing properties of elongate filaments 104 within feedstock line 100, and thus within object 136 are not materially affected. By being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongated filaments 104.

Referring generally to FIG. 1 and particularly to, e.g., FIGS. 9-11, full-length optical core 110 has a full-length-optical-core refractive index. At least one full-length optical waveguide 102 further comprises full-length-optical-core cladding 154, at least partially covering full-length optical core 110. Full-length-optical-core cladding 154 comprises at least first full-length-optical-core cladding resin 156, having a full-length-optical-core first-cladding-resin refractive index. Full-length-optical-core cladding 154 is non-uniform along at least one full-length optical waveguide 102. Full-length-optical-core refractive index is greater than the full-length-optical-core first-cladding-resin refractive index. The preceding subject matter of this paragraph characterizes example 27 of the present disclosure, wherein example 27 also includes the subject matter according to any one of examples 22 to 26, above.

By full-length-optical-core cladding 154 being non-uniform along the length of full-length optical waveguide 102, electromagnetic radiation 118 is permitted to exit full-length optical core 110 via full-length peripheral surface 116. Moreover, by first full-length-optical-core cladding resin 156 having a refractive index that is less than that of full-length optical core 110, electromagnetic radiation 118, upon entering full-length optical core 110, is trapped within full-length optical core 110 other than the regions where first full-length-optical-core cladding resin 156 is not present. As a result, at least one full-length optical waveguide 102 may be constructed to provide a desired amount of electromagnetic radiation 118, exiting various positions along full-length peripheral surface 116, such as to ensure a desired amount of electromagnetic radiation 118, penetrating the shadows of elongate filaments 104.

Referring generally to FIG. 1 and particularly to, e.g., FIGS. 10 and 11, full-length peripheral surface 116 has full-length-peripheral-surface regions 127 devoid of first full-length-optical-core cladding resin 156. Full-length-optical-core cladding 154 further comprises second full-length-optical-core cladding resin 158, having a full-length-optical-core second-cladding-resin refractive index. Second full-length-optical-core cladding resin 158 covers full-length-peripheral-surface regions 127 of full-length peripheral surface 116. The full-length-optical-core second-cladding-resin refractive index is greater than the full-length-optical-core first-cladding-resin refractive index. The preceding subject matter of this paragraph characterizes example 28 of the present disclosure, wherein example 28 also includes the subject matter according to example 27, above.

By covering full-length-peripheral-surface regions 127 with second full-length-optical-core cladding resin 158, a desired refractive index thereof may be selected to optimize how electromagnetic radiation 118 exits full-length peripheral surface 116. Additionally or alternatively, with full-length-peripheral-surface regions 127 covered with second full-length-optical-core cladding resin 158, the integrity of first full-length-optical-core cladding resin 156 may be ensured, such that it does not peel or break off during storage of at least one full-length optical waveguide 102 and during construction of feedstock line 100.

Referring generally to FIG. 1 and particularly to, e.g., FIG. 11, second full-length-optical-core cladding resin 158 also covers first full-length-optical-core cladding resin 156. The preceding subject matter of this paragraph characterizes example 29 of the present disclosure, wherein example 29 also includes the subject matter according to example 28, above.

Full-length optical waveguides according to example 29 may be more easily manufactured, in that full-length optical core 110 with first full-length-optical-core cladding resin 156 simply may be fully coated with second full-length-optical-core cladding resin 158. Additionally or alternatively, the integrity of full-length optical waveguides may be maintained during storage thereof and during construction of feedstock line 100.

Referring generally to FIG. 1 and particularly to, e.g., FIGS. 10 and 11, resin 124 has a resin refractive index. The resin refractive index is greater than the full-length-optical-core second-cladding-resin refractive index. The preceding subject matter of this paragraph characterizes example 30 of the present disclosure, wherein example 30 also includes the subject matter according to example 28 or 29, above.

Because second full-length-optical-core cladding resin 158 has a refractive index less than that of resin 124, electromagnetic radiation 118 will be permitted to exit second full-length-optical-core cladding resin 158 to penetrate and cure resin 124 when feedstock line 100 is used to additively manufacture object 136.

Referring generally to FIG. 1 and particularly to, e.g., FIG. 12, full-length peripheral surface 116 has a surface roughness that is selected such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 31 of the present disclosure, wherein example 31 also includes the subject matter according to any one of examples 22 to 26, above.

Rather than relying on refractive-index properties of a cladding to ensure desired dispersal of electromagnetic radiation 118 from full-length optical core 110 via full-length peripheral surface 116, the surface roughness of full-length peripheral surface 116 is selected such that electromagnetic radiation 118 exits full-length optical core 110 at desired amounts along the length of full-length peripheral surface 116. For example, the surface roughness may create regions of internal reflection of electromagnetic radiation 118 within full-length optical core 110 and may create regions where electromagnetic radiation 118 is permitted to escape full-length optical core 110.

Referring generally to FIG. 1 and particularly to, e.g., FIG. 12, at least one full-length optical waveguide 102 is devoid of any cladding that covers full-length optical core 110. The preceding subject matter of this paragraph characterizes example 32 of the present disclosure, wherein example 32 also includes the subject matter according to example 31, above.

Full-length optical waveguides without any cladding may be less expensive to manufacture than full-length optical waveguides with cladding. Additionally, the difference of refractive indexes between a cladding and resin 124 need not be taken into account when selecting resin 124 for feedstock line 100.

Referring generally to FIG. 1 and particularly to, e.g., FIGS. 5 and 7, at least one full-length optical waveguide 102 is a plurality of full-length optical waveguides, interspersed among elongate filaments 104. The preceding subject matter of this paragraph characterizes example 33 of the present disclosure, wherein example 33 also includes the subject matter according to any one of examples 22 to 32, above.

By including a plurality of full-length optical waveguides, interspersed among elongate filaments 104, such as among a bundle, or tow, of elongate filaments, a desired penetration of electromagnetic radiation 118 into the shadows of elongate filaments 104 is be ensured.

Referring generally to FIG. 1 and particularly to, e.g., FIGS. 5 and 7, elongate filaments 104 are at least one of twisted with, woven with, or braided with the plurality of full-length optical waveguides. The preceding subject matter of this paragraph characterizes example 34 of the present disclosure, wherein example 34 also includes the subject matter according to example 33, above.

By being twisted with, woven with, or braided with elongate filaments 104, the plurality of full-length optical waveguides is interspersed with elongate filaments 104 so that electromagnetic radiation 118, exiting the full-length optical waveguides, is delivered to regions of interior volume 182 that are in the shadows of elongated filaments 104.

Referring generally to FIG. 2 and particularly to, e.g., FIGS. 13 and 14, system 200 for creating feedstock line 100 for additive manufacturing of object 136 is disclosed. Feedstock line 100 has a feedstock-line length. System 200 comprises filament supply 202, filament separator 210, optical-direction-modifier supply 216, combiner 212, and resin supply 206. Filament supply 202 is configured to dispense precursor tow 208, comprising elongate filaments 104. Filament separator 210 is configured to separate precursor tow 208, dispensed from filament supply 202, into individual ones of elongate filaments 104 or into subsets 214 of elongate filaments 104. Each of subsets 214 comprises a plurality of elongate filaments 104. Optical-direction-modifier supply 216 is configured to dispense optical direction modifiers 123 to be applied to the individual ones of elongate filaments 104 or subsets 214 of elongate filaments 104, originating from filament separator 210. Each of optical direction modifiers 123 has outer surface 184, and each of optical direction modifiers 123 is configured such that when electromagnetic radiation 118 strikes outer surface 184 from a first direction, at least a portion of electromagnetic radiation 118 departs outer surface 184 in a second direction that is at an angle to the first direction. Combiner 212 is configured to combine the individual ones of elongate filaments 104 and optical direction modifiers 123, dispensed by optical-direction-modifier supply 216, or subsets 214 of elongate filaments 104 and optical direction modifiers 123, dispensed by optical-direction-modifier supply 216, into derivative tow 209 so that optical direction modifiers 123 are interspersed among elongate filaments 104. Resin supply 206 is configured to provide resin 124 to be applied to at least one of (i) precursor tow 208, dispensed from filament supply 202, (ii) the individual ones of elongate filaments 104 or subsets 214 of elongate filaments 104, originating from filament separator 210, (iii) optical direction modifiers 123, dispensed from optical-direction-modifier supply 216, or (iv) derivative tow 209, originating from combiner 212, such that elongate filaments 104 and optical direction modifiers 123 in derivative tow 209 are covered with resin 124. The preceding subject matter of this paragraph characterizes example 35 of the present disclosure.

Creating feedstock line 100 from precursor tow 208 permits the use of off-the-shelf reinforcement fiber tows. Filament separator 210 separates precursor tow 208 into individual ones of elongate filaments 104 or into subsets 214 of elongate filaments 104, so that optical direction modifiers 123 may be operatively interspersed with elongate filaments 104. Combiner 212 then combines elongate filaments 104 and optical direction modifiers 123 into derivative tow 209 to ultimately become feedstock line 100 with resin 124. Resin supply 206 dispenses resin 124 at any suitable location as feedstock line 100 is being created, including one or more of (i) at precursor tow 208 before it is separated into individual ones of elongate filaments 104 or into subsets 214 of elongate filaments 104, (ii) at elongate filaments 104 that have been separated from the precursor tow 208, (iii) at or with optical direction modifiers 123 before they are combined with elongate filaments 104, or (iv) at derivative tow 209 after optical direction modifiers 123 have been combined with elongate filaments 104.

Precursor tow 208 may take any suitable form depending on the desired properties of feedstock line 100. As mentioned, precursor tow 208 may be (but is not required to be) an off-the-shelf precursor tow, with such examples including tows having 1000, 3000, 6000, 12000, 24000, or 48000 continuous individual fibers within the tow, but other examples also may be used.

Filament separator 210 may take any suitable configuration, such that it is configured to operatively separate precursor tow 208 into individual ones of elongate filaments 104 or subsets 214 thereof. For example, filament separator 210 may comprise at least one of a knife, an air knife, a comb, a mesh, a screen, a series of polished idlers, and other mechanisms known in the art.

Combiner 212 may take any suitable configuration, such that it is configured to operatively combine elongate filaments 104 with optical direction modifiers 123, such that optical direction modifiers 123 become interspersed among elongate filaments 104. For example, combiner 212 may at least one of twist, weave, braid, or otherwise bundle elongate filaments 104 together with optical direction modifiers 123. Combiner 212 also may include a fixator, such as a mesh or screen, through which elongate filaments 104 extend, and which prevents the twisting, weaving, braiding, or bundling from propagating upstream of combiner 212.

Resin supply 206 may take any suitable configuration, such that it is configured to operatively dispense and apply resin 124 at an operative location. For example, resin supply 206 may be configured to spray or mist resin 124. Additionally or alternatively, resin supply 206 may include a reservoir or bath of resin 124, through which is pulled at least one of precursor tow 208, individual ones of elongate filaments 104, subsets 214 of elongate filaments 104, or derivative tow 209.

In some examples, system 200 may further comprise chamber 224 between filament separator 210 and combiner 212, and through which individual ones of elongate filaments 104 or subsets 214 of elongate filaments 104 pass as feedstock line 100 is being created. In some such examples, resin 124 is applied to at least elongate filaments 104, and in some examples, also to or with optical direction modifiers 123, in chamber 224.

Referring generally to FIG. 2, elongate filaments 104 are opaque to electromagnetic radiation 118. The preceding subject matter of this paragraph characterizes example 36 of the present disclosure, wherein example 36 also includes the subject matter according to example 35, above.

As discussed, elongate filaments 104 that are opaque to electromagnetic radiation 118 may be well suited for inclusion in feedstock line 100, as optical direction modifiers 123 operatively will disperse electromagnetic radiation 118 into the shadows of elongate filaments 104 when feedstock line 100 is being used to additively manufacture object 136 with in situ curing thereof.

Referring generally to FIG. 2 and particularly to, e.g., FIGS. 9-12, optical direction modifiers 123 comprise partial-length optical waveguides 122. Each of partial-length optical waveguides 122 comprises partial-length optical core 138. Partial-length optical core 138 of each of partial-length optical waveguides 122 comprises first partial-length-optical-core end face 140, second partial-length-optical-core end face 142, opposite first partial-length-optical-core end face 140, and partial-length peripheral surface 144, extending between first partial-length-optical-core end face 140 and second partial-length-optical-core end face 142. Each of partial-length optical waveguides 122 is configured such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144. The preceding subject matter of this paragraph characterizes example 37 of the present disclosure, wherein example 37 also includes the subject matter according to example 35 or 36, above.

As discussed, partial-length optical waveguides 122 may be cost effective to create, such as according to the various methods disclosed here. Moreover, by being interspersed among elongate filaments 104, partial-length optical waveguides 122 may directly receive electromagnetic radiation 118 and deliver electromagnetic radiation 118 into the shadows of elongate filaments 104.

Referring generally to FIG. 2 and particularly to, e.g., FIGS. 9-11, partial-length optical core 138 has a partial-length-optical-core refractive index. Each of partial-length optical waveguides 122 further comprises partial-length-optical-core cladding 160, at least partially covering partial-length optical core 138. Partial-length-optical-core cladding 160 comprises at least first partial-length-optical-core cladding resin 162, having a partial-length-optical-core first-cladding-resin refractive index. Partial-length-optical-core cladding 160 is non-uniform along each of partial-length optical waveguides 122. The partial-length-optical-core refractive index is greater than the partial-length-optical-core first-cladding-resin refractive index. The preceding subject matter of this paragraph characterizes example 38 of the present disclosure, wherein example 38 also includes the subject matter according to example 37, above.

As discussed, by partial-length-optical-core cladding 160 being non-uniform along the length of partial-length optical waveguides 122, electromagnetic radiation 118 is permitted to exit partial-length optical core 138 via partial-length peripheral surface 144. Moreover, by first partial-length-optical-core cladding resin 162 having a refractive index that is less than that of partial-length optical core 138, electromagnetic radiation 118, upon entering partial-length optical core 138, is trapped within partial-length optical core 138 other than the regions where first partial-length-optical-core cladding resin 162 is not present. As a result, partial-length optical waveguides 122 may be constructed to provide a desired amount of electromagnetic radiation 118, exiting various positions along partial-length peripheral surface 144, such as to ensure a desired amount of electromagnetic radiation 118, penetrating the shadows of elongate filaments 104 when feedstock line 100 is being used to additively manufacture object 136.

Referring generally to FIG. 2 and particularly to, e.g., FIGS. 10 and 11, partial-length peripheral surface 144 of partial-length optical core 138 of each of partial-length optical waveguides 122 has partial-length-peripheral-surface regions 129 devoid of first partial-length-optical-core cladding resin 162. Partial-length-optical-core cladding 160 further comprises second partial-length-optical-core cladding resin 164, having a partial-length-optical-core second-cladding-resin refractive index. Second partial-length-optical-core cladding resin 164 covers partial-length-peripheral-surface regions 129 of partial-length peripheral surface 144. The partial-length-optical-core second-cladding-resin refractive index is greater than the partial-length-optical-core first-cladding-resin refractive index. The preceding subject matter of this paragraph characterizes example 39 of the present disclosure, wherein example 39 also includes the subject matter according to example 38, above.

As discussed, by covering partial-length-peripheral-surface regions 129 with second partial-length-optical-core cladding resin 164, a desired refractive index thereof may be selected to optimize how electromagnetic radiation 118 exits partial-length peripheral surface 144. Additionally or alternatively, with partial-length-peripheral-surface regions 129 covered with second partial-length-optical-core cladding resin 164, the integrity of first partial-length-optical-core cladding resin 162 may be ensured, such that it does not peel or break off during storage of partial-length optical waveguides 122 and during construction of feedstock line 100.

Referring generally to FIG. 2 and particularly to, e.g., FIG. 11, second partial-length-optical-core cladding resin 164 also covers first partial-length-optical-core cladding resin 162. The preceding subject matter of this paragraph characterizes example 40 of the present disclosure, wherein example 40 also includes the subject matter according to example 39, above.

As discussed, partial-length optical waveguides 122, such as according to example 40, may be more easily manufactured, in that partial-length optical core 138 with first partial-length-optical-core cladding resin 162 simply may be fully coated with second partial-length-optical-core cladding resin 164. Additionally or alternatively, the integrity of partial-length optical waveguides 122 may be maintained during storage thereof and during construction of feedstock line 100.

Referring generally to FIG. 2 and particularly to, e.g., FIGS. 10 and 11, resin 124 has a resin refractive index. The resin refractive index is greater than the partial-length-optical-core second-cladding-resin refractive index. The preceding subject matter of this paragraph characterizes example 41 of the present disclosure, wherein example 41 also includes the subject matter according to example 39 or 40, above.

Again, because second partial-length-optical-core cladding resin 164 has a refractive index less than that of resin 124, electromagnetic radiation 118 will be permitted to exit second partial-length-optical-core cladding resin 164 to penetrate and cure resin 124 when feedstock line 100 is being used to additively manufacture object 136.

Referring generally to FIG. 2 and particularly to, e.g., FIG. 12, partial-length peripheral surface 144 of partial-length optical core 138 of each of partial-length optical waveguides 122 has a surface roughness that is selected such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144. The preceding subject matter of this paragraph characterizes example 42 of the present disclosure, wherein example 42 also includes the subject matter according to example 37 or 38, above.

Again, rather than relying on refractive-index properties of a cladding to ensure desired dispersal of electromagnetic radiation 118 from partial-length optical core 138 via partial-length peripheral surface 144, the surface roughness of partial-length peripheral surface 144 is selected such that electromagnetic radiation 118 exits partial-length optical core 138 at desired amounts along the length of partial-length peripheral surface 144. For example, the surface roughness may create regions of internal reflection of electromagnetic radiation 118 within partial-length optical core 138 and may create regions where electromagnetic radiation 118 is permitted to escape partial-length optical core 138.

Referring generally to FIG. 2 and particularly to, e.g., FIG. 12, each of partial-length optical waveguides 122 is devoid of any cladding that covers partial-length optical core 138. The preceding subject matter of this paragraph characterizes example 43 of the present disclosure, wherein example 43 also includes the subject matter according to example 42, above.

Again, partial-length optical waveguides 122 without any cladding may be less expensive to manufacture than partial-length optical waveguides 122 with cladding. Additionally, the difference of refractive indexes between a cladding and resin 124 need not be taken into account when selecting resin 124 for feedstock line 100.

Referring generally to FIG. 2 and particularly to, e.g., FIGS. 15-17, optical direction modifiers 123 comprise optical direction-modifying particles 186. Optical direction-modifying particles 186 are configured to at least one of reflect, refract, diffract, or Rayleigh-scatter electromagnetic radiation 118, incident on outer surface 184 of any one of optical direction-modifying particles 186 to disperse electromagnetic radiation 118. The preceding subject matter of this paragraph characterizes example 44 of the present disclosure, wherein example 44 also includes the subject matter according to any one of examples 35 to 43, above.

As discussed, inclusion of optical direction-modifying particles 186 that at least one of reflect, refract, diffract, or Rayleigh-scatter electromagnetic radiation 118 provides for further dispersion of electromagnetic radiation 118 within interior volume 182 for irradiation of resin 124 therein when feedstock line 100 is being used to additively manufacture object 136. Moreover, because they are particles, optical direction-modifying particles 186 more easily are interspersed among elongate filaments 104 when applied thereto. In addition, in some examples of feedstock line 100, they may be generally uniformly spaced throughout resin 124 within interior volume 182 and effectively scatter electromagnetic radiation 118 throughout interior volume 182 to penetrate among elongate filaments 104 and into the shadows cast by elongate filaments 104 when feedstock line 100 is being used to additively manufacture object 136. In other examples of feedstock line 100, optical direction-modifying particles 186 may have a gradient of concentration within interior volume 182

Referring generally to FIG. 2 and particularly to, e.g., FIGS. 4, 6, 7, and 15-17, each of elongate filaments 104 has a minimum outer dimension. Each of optical direction-modifying particles 186 has a maximum outer dimension that is less than one-eighth the minimum outer dimension of any one of elongate filaments 104. The preceding subject matter of this paragraph characterizes example 45 of the present disclosure, wherein example 45 also includes the subject matter according to example 44, above.

Again, by having a maximum outer dimension that is less than one-eighth the minimum outer dimension of elongate filaments 104, optical direction-modifying particles 186 are easily dispersed among elongate filaments 104. Moreover, optical direction-modifying particles 186 may easily flow with resin 124 to operatively disperse optical direction-modifying particles 186 throughout feedstock line 100, including into the shadows of elongate filaments 104.

Referring generally to FIG. 2 and particularly to, e.g., FIGS. 15-17, each of optical direction-modifying particles 186 has a maximum outer dimension that is less than 1000 nm, 500 nm, 250 nm, or 200 nm. The preceding subject matter of this paragraph characterizes example 46 of the present disclosure, wherein example 46 also includes the subject matter according to example 44 or 45, above.

As discussed, typical reinforcement fibers for composite materials often have a diameter in the range of 5 to 8 microns. By having a maximum outer dimension that is less than 1000 nm (1 micron), 500 nm (0.5 micron), 250 nm (0.25 micron), or 200 nm (0.200 micron), optical direction-modifying particles 186 easily extend between typical sizes of elongate filaments 104. Moreover, optical direction-modifying particles 186 may easily flow with resin 124 to operatively disperse optical direction-modifying particles 186 throughout feedstock line 100, including into the shadows of elongate filaments 104.

Referring generally to FIG. 2 and particularly to, e.g., FIGS. 15-17, electromagnetic radiation 118 has a wavelength. Each of optical direction-modifying particles 186 has a minimum outer dimension that is greater than one-fourth the wavelength of electromagnetic radiation 118. The preceding subject matter of this paragraph characterizes example 47 of the present disclosure, wherein example 47 also includes the subject matter according to any one of examples 44 to 46, above.

Again, selecting a minimum outer dimension of optical direction-modifying particles 186 that is greater than one-fourth the wavelength of electromagnetic radiation 118 that will be used when additively manufacturing object 136 ensures that optical direction-modifying particles 186 will have the intended effect of causing electromagnetic radiation 118 to reflect, refract, or diffract upon hitting optical direction-modifying particles 186.

Referring generally to FIG. 2 and particularly to, e.g., FIGS. 15-17, each of optical direction-modifying particles 186 has a minimum outer dimension that is greater than or equal to 50 nm or that is greater than or equal to 100 nm. The preceding subject matter of this paragraph characterizes example 48 of the present disclosure, wherein example 48 also includes the subject matter according to any one of examples 44 to 47, above.

As discussed, ultra-violet light having a wavelength of about 400 nm is often used in connection with ultra-violet photopolymers. Accordingly, when resin 124 comprises or consists of a photopolymer, optical direction-modifying particles 186 having a minimum outer dimension that is greater than or equal to 100 nm ensures that optical direction-modifying particles 186 will have the intended effect of causing electromagnetic radiation 118 to reflect, refract, or diffract upon hitting optical direction-modifying particles 186. However, in other examples, a minimum outer dimension as low as 50 nm may be appropriate.

Referring generally to FIG. 2 and particularly to, e.g., FIGS. 1, 4, 6, and 7, in feedstock line 100, optical direction-modifying particles 186 comprise less than 10% by weight of resin 124, less than 5% by weight of resin 124, or less than 1% by weight of resin 124. The preceding subject matter of this paragraph characterizes example 49 of the present disclosure, wherein example 49 also includes the subject matter according to any one of examples 44 to 48, above.

As discussed, by limiting optical direction-modifying particles 186 to the referenced threshold percentages, resin 124 will operatively flow among elongate filaments 104 when combiner 212 combines elongate filaments 104 and optical direction-modifying particles 186. In addition, desired properties of resin 124, feedstock line 100, and ultimately object 136 will not be negatively impacted by the presence of optical direction-modifying particles 186.

Referring generally to FIG. 2 and particularly to, e.g., FIGS. 15-17, outer surfaces 184 of at least some of optical direction-modifying particles 186 are faceted. The preceding subject matter of this paragraph characterizes example 50 of the present disclosure, wherein example 50 also includes the subject matter according to any one of examples 44 to 49, above.

Again, by being faceted, outer surfaces 184 effectively scatter electromagnetic radiation 118.

Referring generally to FIG. 2 and particularly to, e.g., FIGS. 15-17, outer surfaces 184 of at least some of optical direction-modifying particles 186 have a surface roughness that is selected such that when electromagnetic radiation 118 strikes outer surfaces 184, electromagnetic radiation 118 is scattered. The preceding subject matter of this paragraph characterizes example 51 of the present disclosure, wherein example 51 also includes the subject matter according to any one of examples 44 to 50, above.

As discussed, having a surface roughness selected to scatter electromagnetic radiation 118 facilitates the operative irradiation of resin 124 throughout feedstock line 100, including into the shadows of elongate filaments 104, when feedstock line 100 is being used to additively manufacture object 136.

Referring generally to FIG. 2 and particularly to, e.g., FIGS. 4, 6, and 7, resin 124 has a resin refractive index. At least some of optical direction-modifying particles 186 have a particle refractive index. The particle refractive index is greater than or less than the resin refractive index. The preceding subject matter of this paragraph characterizes example 52 of the present disclosure, wherein example 52 also includes the subject matter according to any one of examples 44 to 51, above.

Again, when optical direction-modifying particles 186 have a refractive index that is different from the refractive index of resin 124, electromagnetic radiation 118 incident upon the outer surfaces thereof will necessarily leave the outer surfaces at a different angle, and thus will scatter throughout resin 124, including into the shadows of elongate filaments 104.

Referring generally to FIG. 2 and particularly to, e.g., FIG. 15, at least some of optical direction-modifying particles 186 are spherical. The preceding subject matter of this paragraph characterizes example 53 of the present disclosure, wherein example 53 also includes the subject matter according to any one of examples 44 to 52, above.

Again, by being spherical, optical direction-modifying particles 186 easily may be positioned among elongate filaments 104 and may easily flow with resin 124 as combiner 212 combines elongate filaments 104 and optical direction-modifying particles 186.

Referring generally to FIG. 2 and particularly to, e.g., FIG. 16, at least some of optical direction-modifying particles 186 are prismatic. The preceding subject matter of this paragraph characterizes example 54 of the present disclosure, wherein example 54 also includes the subject matter according to any one of examples 44 to 53, above.

Again, by being prismatic, optical direction-modifying particles 186 may be selected to operatively at least one of reflect, refract, or diffract electromagnetic radiation 118, as discussed herein.

Referring generally to FIG. 2 and particularly to, e.g., FIG. 14, optical-direction-modifier supply 216 and resin supply 206 together form combined supply 222, configured to dispense optical direction modifiers 123 together with resin 124. The preceding subject matter of this paragraph characterizes example 55 of the present disclosure, wherein example 55 also includes the subject matter according to any one of examples 35 to 54, above.

That is, combined supply 222 may dispense optical direction modifiers 123 in a volume of resin 124. Stated differently, optical direction modifiers 123 may be suspended within resin 124. By using combined supply 222, even dispersion of optical direction modifiers 123 may be ensured, and a less-expensive system 200 may be constructed. For example, combined supply 222 may spray or mist resin 124 and optical direction modifiers 123 together to apply them to elongate filaments 104, or elongate filaments 104 may be pulled through a bath of resin 124 with optical direction modifiers 123 suspended therein.

Referring generally to FIG. 2 and particularly to, e.g., FIGS. 13 and 14, filament separator 210 is configured to impart a first electrical charge to elongate filaments 104 as precursor tow 208 is separated into the individual ones of elongate filaments 104 or into subsets 214 of elongate filaments 104. Resin supply 206 is configured to impart a second electrical charge to resin 124 when resin 124 is applied to at least one of (i) the individual ones of elongate filaments 104 or subsets 214 of elongate filaments 104 and originating from filament separator 210, or (ii) derivative tow 209, originating from combiner 212, such that elongate filaments 104 and optical direction modifiers 123 in derivative tow 209 are covered with resin 124. The second electrical charge and the first electrical charge have opposite signs. The preceding subject matter of this paragraph characterizes example 56 of the present disclosure, wherein example 56 also includes the subject matter according to any one of examples 35 to 55, above. By imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to FIG. 2 and particularly to, e.g., FIG. 14, system 200 further comprises full-length-optical-waveguide supply 204, configured to dispense at least one full-length optical waveguide 102. Combiner 212 is further configured to combine at least one full-length optical waveguide 102, dispensed by full-length-optical-waveguide supply 204, with the individual ones of elongate filaments 104 or subsets 214 of elongate filaments 104, originating from filament separator 210, and optical direction modifiers 123 into derivative tow 209 so that at least one full-length optical waveguide 102 is interspersed among elongate filaments 104. Resin supply 206 is further configured such that at least one full-length optical waveguide 102 in derivative tow 209 is covered by resin 124. The preceding subject matter of this paragraph characterizes example 57 of the present disclosure, wherein example 57 also includes the subject matter according to any one of examples 35 to 56, above.

As discussed, inclusion of at least one full-length optical waveguide 102 in feedstock line 100 further facilitates penetration of electromagnetic radiation 118 into interior volume 182 of feedstock line 100 for irradiation of resin 124, despite regions of resin 124 being in the shadows of elongate filaments 104 cast by the direct (i.e., line-of-sight) application of electromagnetic radiation 118.

Referring generally to FIG. 2 and particularly to, e.g., FIG. 14, at least one full-length optical waveguide 102 comprises full-length optical core 110. Full-length optical core 110 comprises first full-length-optical-core end face 112, second full-length-optical-core end face 114, opposite first full-length-optical-core end face 112, and full-length peripheral surface 116, extending between first full-length-optical-core end face 112 and second full-length-optical-core end face 114. At least one full-length optical waveguide 102 is configured such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116. The preceding subject matter of this paragraph characterizes example 58 of the present disclosure, wherein example 58 also includes the subject matter according to example 57, above.

As discussed, even when electromagnetic radiation 118 is shielded from directly reaching all regions of resin 124, at least one full-length optical waveguide 102 may receive electromagnetic radiation 118 via one or more of its first full-length-optical-core end face 112, its second full-length-optical-core end face 114, or its full-length peripheral surface 116, and disperse electromagnetic radiation 118 via at least its full-length peripheral surface 116 to indirectly reach regions of resin 124. Not only may at least one full-length optical waveguide 102 serve to disperse electromagnetic radiation 118 into the shadows of elongate filaments 104, it also may serve to redirect electromagnetic radiation 118 to optical direction modifiers 123 for penetration into the shadows of elongate filaments 104 by at least one full-length optical waveguide 102. Additionally or alternatively, optical direction modifiers 123 may serve to redirect electromagnetic radiation 118 to at least one full-length optical waveguide 102 for penetration into the shadows of elongate filaments 104 by at least one full-length optical waveguide 102.

Referring generally to FIG. 2 and particularly to, e.g., FIGS. 9-12, at least one full-length optical waveguide 102 is configured such that when electromagnetic radiation 118 enters first full-length-optical-core end face 112 of full-length optical core 110, an initial portion of electromagnetic radiation 118 exits full-length optical core 110 via full-length peripheral surface 116 and a final portion of electromagnetic radiation 118, remaining in full-length optical core 110 after the initial portion of electromagnetic radiation 118 exits full-length optical core 110, exits full-length optical core 110 via second full-length-optical-core end face 114. The preceding subject matter of this paragraph characterizes example 59 of the present disclosure, wherein example 59 also includes the subject matter according to example 58, above.

In other words, in some examples of feedstock line 100, if electromagnetic radiation 118 enters first full-length-optical-core end face 112, it will exit both full-length peripheral surface 116 and second full-length-optical-core end face 114, as opposed, for example, to electromagnetic radiation 118 being fully emitted via full-length peripheral surface 116. As discussed, such examples of feedstock line 100 are well suited for additive manufacturing systems and methods in which electromagnetic radiation 118 is directed at first full-length-optical-core end face 112 as feedstock line 100 is being constructed and as object 136 is being manufactured.

Referring generally to FIG. 2 and particularly to, e.g., FIGS. 9-12, at least one full-length optical waveguide 102 is configured such that the initial portion of electromagnetic radiation 118, which exits full-length optical core 110 via full-length peripheral surface 116, is greater than or equal to the final portion of electromagnetic radiation 118, which exits full-length optical core 110 via second full-length-optical-core end face 114. The preceding subject matter of this paragraph characterizes example 60 of the present disclosure, wherein example 60 also includes the subject matter according to example 59, above.

As discussed, in such configurations, it is ensured that a desired amount of electromagnetic radiation 118 exits full-length optical core 110 via full-length peripheral surface 116 to operatively cure resin 124 among elongate filaments 104 within interior volume 182 of feedstock line 100 when feedstock line 100 is used to additively manufacture object 136.

Referring generally to FIG. 2 and particularly to, e.g., FIGS. 9-11, full-length optical core 110 has a full-length-optical-core refractive index. At least one full-length optical waveguide 102 further comprises full-length-optical-core cladding 154, at least partially covering full-length optical core 110. Full-length-optical-core cladding 154 comprises at least first full-length-optical-core cladding resin 156, having a full-length-optical-core first-cladding-resin refractive index. Full-length-optical-core cladding 154 is non-uniform along at least one full-length optical waveguide 102. The full-length-optical-core refractive index is greater than the full-length-optical-core first-cladding-resin refractive index. The preceding subject matter of this paragraph characterizes example 61 of the present disclosure, wherein example 61 also includes the subject matter according to any one of examples 58 to 60, above.

As discussed, by full-length-optical-core cladding 154 being non-uniform along the length of the full-length optical waveguide, electromagnetic radiation 118 is permitted to exit full-length optical core 110 via full-length peripheral surface 116. Moreover, by first full-length-optical-core cladding resin 156 having a refractive index that is less than that of full-length optical core 110, electromagnetic radiation 118, upon entering full-length optical core 110, is trapped within full-length optical core 110 other than the regions where first full-length-optical-core cladding resin 156 is not present. As a result, the full-length optical waveguide may be constructed to provide a desired amount of electromagnetic radiation 118, exiting various positions along full-length peripheral surface 116, such as to ensure a desired amount of electromagnetic radiation 118, penetrating the shadows of elongate filaments 104 when feedstock line 100 is used to additively manufacture object 136.

Referring generally to FIG. 2 and particularly to, e.g., FIGS. 10 and 11, full-length peripheral surface 116 has full-length-peripheral-surface regions 127 devoid of first full-length-optical-core cladding resin 156. Full-length-optical-core cladding 154 further comprises second full-length-optical-core cladding resin 158, having a full-length-optical-core second-cladding-resin refractive index. Second full-length-optical-core cladding resin 158 covers full-length-peripheral-surface regions 127 of full-length peripheral surface 116. The full-length-optical-core second-cladding-resin refractive index is greater than the full-length-optical-core first-cladding-resin refractive index. The preceding subject matter of this paragraph characterizes example 62 of the present disclosure, wherein example 62 also includes the subject matter according to example 61, above.

As discussed, by covering full-length-peripheral-surface regions 127 with second full-length-optical-core cladding resin 158, a desired refractive index thereof may be selected to optimize how electromagnetic radiation 118 exits full-length peripheral surface 116. Additionally or alternatively, with full-length-peripheral-surface regions 127 covered with second full-length-optical-core cladding resin 158, the integrity of first full-length-optical-core cladding resin 156 may be ensured, such that it does not peel or break off during storage of at least one full-length optical waveguide 102 and during construction of feedstock line 100.

Referring generally to FIG. 2 and particularly to, e.g., FIG. 11, second full-length-optical-core cladding resin 158 also covers first full-length-optical-core cladding resin 156. The preceding subject matter of this paragraph characterizes example 63 of the present disclosure, wherein example 63 also includes the subject matter according to example 62, above.

As discussed, full-length optical waveguides, such as according to example 62, may be more easily manufactured, in that full-length optical core 110 with first full-length-optical-core cladding resin 156 simply may be fully coated with second full-length-optical-core cladding resin 158. Additionally or alternatively, the integrity of full-length optical waveguides may be maintained during storage thereof and during construction of feedstock line 100.

Referring generally to FIG. 2 and particularly to, e.g., FIGS. 10 and 11, resin 124 has a resin refractive index. The resin refractive index is greater than the full-length-optical-core second-cladding-resin refractive index. The preceding subject matter of this paragraph characterizes example 64 of the present disclosure, wherein example 64 also includes the subject matter according to example 62 or 63, above.

As discussed, because second full-length-optical-core cladding resin 158 has a refractive index less than that of resin 124, electromagnetic radiation 118 will be permitted to exit second full-length-optical-core cladding resin 158 to penetrate and cure resin 124 when feedstock line 100 is used to additively manufacture object 136.

Referring generally to FIG. 2 and particularly to, e.g., FIG. 12, full-length peripheral surface 116 has a surface roughness that is selected such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116. The preceding subject matter of this paragraph characterizes example 65 of the present disclosure, wherein example 65 also includes the subject matter according to any one of examples 58 to 60, above.

As discussed, rather than relying on refractive-index properties of a cladding to ensure desired dispersal of electromagnetic radiation 118 from full-length optical core 110 via full-length peripheral surface 116, the surface roughness of full-length peripheral surface 116 is selected such that electromagnetic radiation 118 exits full-length optical core 110 at desired amounts along the length of full-length peripheral surface 116. For example, the surface roughness may create regions of internal reflection of electromagnetic radiation 118 within full-length optical core 110 and may create regions where electromagnetic radiation 118 is permitted to escape full-length optical core 110.

Referring generally to FIG. 2 and particularly to, e.g., FIG. 12, at least one full-length optical waveguide 102 is devoid of any cladding that covers full-length optical core 110. The preceding subject matter of this paragraph characterizes example 66 of the present disclosure, wherein example 66 also includes the subject matter according to example 65, above.

As discussed, full-length optical waveguides without any cladding may be less expensive to manufacture than full-length optical waveguides with cladding. Additionally, the difference of refractive indexes between a cladding and resin 124 need not be taken into account when selecting resin 124 for feedstock line 100.

Referring generally to FIG. 2 and particularly to, e.g., FIGS. 13 and 14, combiner 212 is configured to at least one of twist, weave, or braid the individual ones of elongate filaments 104 and at least one full-length optical waveguide 102, dispensed by full-length-optical-waveguide supply 204, or subsets 214 of elongate filaments 104, originating from filament separator 210, and at least one full-length optical waveguide 102, dispensed by full-length-optical-waveguide supply 204, into derivative tow 209. The preceding subject matter of this paragraph characterizes example 67 of the present disclosure, wherein example 67 also includes the subject matter according to any one of examples 56 to 66, above.

As discussed, by being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongate filaments 104 when feedstock line 100 is used to additively manufacture object 136.

As an example, combiner 212 may comprise a spool that winds up derivative tow 209 while simultaneously twisting derivative tow 209. Other mechanisms for twisting, weaving, or braiding multi-filament structures, as known in the art, also may be used.

Referring generally to, e.g., FIGS. 13 and 14, and particularly to FIG. 18, method 300 of creating feedstock line 100 for additive manufacturing of object 136 is disclosed. Feedstock line 100 has a feedstock-line length. Method 300 comprises a step of (block 302) separating precursor tow 208, comprising elongate filaments 104, into individual ones of elongate filaments 104 or into subsets 214 of elongate filaments 104. Each of subsets 214 comprises a plurality of elongate filaments 104. Method 300 also comprises a step of (block 304) applying optical direction modifiers 123 to the individual ones of elongate filaments 104 or to subsets 214 of elongate filaments 104. Each of optical direction modifiers 123 has outer surface 184 and each of optical direction modifiers 123 is configured such that when electromagnetic radiation 118 strikes outer surface 184 from a first direction, at least a portion of electromagnetic radiation 118 departs outer surface 184 in a second direction that is at an angle to the first direction. Method 300 further comprises a step of (block 306) combining optical direction modifiers 123 with the individual ones of elongate filaments 104 or subsets 214 of elongate filaments 104 into derivative tow 209 so that optical direction modifiers 123 are interspersed among elongate filaments 104. Method 300 also comprises a step of (block 308) applying resin 124 to cover elongate filaments 104 and optical direction modifiers 123 such that elongate filaments 104 and optical direction modifiers 123 are covered by resin 124 in derivative tow 209. The preceding subject matter of this paragraph characterizes example 68 of the present disclosure.

As discussed in connection with system 200, creating feedstock line 100 from precursor tow 208 permits the use of off-the-shelf reinforcement fiber tows. By separating precursor tow 208 into individual ones of elongate filaments 104 or into subsets 214 of elongate filaments 104, optical direction modifiers 123 may be operatively interspersed with elongate filaments 104. Covering elongate filaments 104 and optical direction modifiers 123 with resin 124 ensures that elongate filaments 104 and optical direction modifiers 123 are wetted and have suitable integrity for additively manufacturing object 136.

Referring generally to, e.g., FIGS. 13 and 14, according to method 300, elongate filaments 104 are opaque to electromagnetic radiation 118. The preceding subject matter of this paragraph characterizes example 69 of the present disclosure, wherein example 69 also includes the subject matter according to example 68, above.

Again, elongate filaments 104 that are opaque to electromagnetic radiation 118 may be well suited for inclusion in feedstock line 100, as optical direction modifiers 123 operatively will disperse electromagnetic radiation 118 into the shadows of elongate filaments 104 when feedstock line 100 is being used to additively manufacture object 136 with in situ curing thereof.

Referring generally to, e.g., FIGS. 9-12, according to method 300, optical direction modifiers 123 comprise partial-length optical waveguides 122. Each of partial-length optical waveguides 122 comprises partial-length optical core 138. Partial-length optical core 138 of each of partial-length optical waveguides 122 comprises first partial-length-optical-core end face 140, second partial-length-optical-core end face 142, opposite first partial-length-optical-core end face 140, and partial-length peripheral surface 144, extending between first partial-length-optical-core end face 140 and second partial-length-optical-core end face 142. Each of partial-length optical waveguides 122 is configured such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144. The preceding subject matter of this paragraph characterizes example 70 of the present disclosure, wherein example 70 also includes the subject matter according to example 68 or 69, above.

As discussed, partial-length optical waveguides 122 may be cost effective to create, such as according to the various methods disclosed here. Moreover, by being interspersed among elongate filaments 104, partial-length optical waveguides 122 may directly receive electromagnetic radiation 118 and deliver electromagnetic radiation 118 into the shadows of elongate filaments 104.

Referring generally to, e.g., FIGS. 9-11, according to method 300, partial-length optical core 138 has a partial-length-optical-core refractive index. Each of partial-length optical waveguides 122 further comprises partial-length-optical-core cladding 160, at least partially covering partial-length optical core 138. Partial-length-optical-core cladding 160 comprises at least first partial-length-optical-core cladding resin 162, having a partial-length-optical-core first-cladding-resin refractive index. Partial-length-optical-core cladding 160 is non-uniform along each of partial-length optical waveguides 122. Partial-length-optical-core refractive index is greater than the partial-length-optical-core first-cladding-resin refractive index. The preceding subject matter of this paragraph characterizes example 71 of the present disclosure, wherein example 71 also includes the subject matter according to example 70, above.

Again, by partial-length-optical-core cladding 160 being non-uniform along the length of partial-length optical waveguides 122, electromagnetic radiation 118 is permitted to exit partial-length optical core 138 via partial-length peripheral surface 144. Moreover, by first partial-length-optical-core cladding resin 162 having a refractive index that is less than that of partial-length optical core 138, electromagnetic radiation 118, upon entering partial-length optical core 138, is trapped within partial-length optical core 138 other than the regions where first partial-length-optical-core cladding resin 162 is not present. As a result, partial-length optical waveguides 122 may be constructed to provide a desired amount of electromagnetic radiation 118, exiting various positions along partial-length peripheral surface 144, such as to ensure a desired amount of electromagnetic radiation 118, penetrating the shadows of elongate filaments 104 when feedstock line 100 is being used to additively manufacture object 136.

Referring generally to, e.g., FIGS. 10 and 11, according to method 300, partial-length peripheral surface 144 of partial-length optical core 138 of each of partial-length optical waveguides 122 has partial-length-peripheral-surface regions 129 devoid of first partial-length-optical-core cladding resin 162. Partial-length-optical-core cladding 160 further comprises second partial-length-optical-core cladding resin 164, having a partial-length-optical-core second-cladding-resin refractive index. Second partial-length-optical-core cladding resin 164 covers partial-length-peripheral-surface regions 129 of partial-length peripheral surface 144. The partial-length-optical-core second-cladding-resin refractive index is greater than the partial-length-optical-core first-cladding-resin refractive index. The preceding subject matter of this paragraph characterizes example 72 of the present disclosure, wherein example 72 also includes the subject matter according to example 71, above.

As discussed, by covering partial-length-peripheral-surface regions 129 with second partial-length-optical-core cladding resin 164, a desired refractive index thereof may be selected to optimize how electromagnetic radiation 118 exits partial-length peripheral surface 144. Additionally or alternatively, with partial-length-peripheral-surface regions 129 covered with second partial-length-optical-core cladding resin 164, the integrity of first partial-length-optical-core cladding resin 162 may be ensured, such that it does not peel or break off during storage of partial-length optical waveguides 122 and during implementation of method 300.

Referring generally to, e.g., FIG. 11, according to method 300, second partial-length-optical-core cladding resin 164 also covers first partial-length-optical-core cladding resin 162. The preceding subject matter of this paragraph characterizes example 73 of the present disclosure, wherein example 73 also includes the subject matter according to example 72, above.

As discussed, partial-length optical waveguides 122, such as according to example 73, may be more easily manufactured, in that partial-length optical core 138 with first partial-length-optical-core cladding resin 162 simply may be fully coated with second partial-length-optical-core cladding resin 164. Additionally or alternatively, the integrity of partial-length optical waveguides 122 may be maintained during storage thereof and during implementation of method 300.

Referring generally to, e.g., FIGS. 10 and 11, and particularly to FIG. 18, according to method 300, resin 124 has a resin refractive index. The resin refractive index is greater than the partial-length-optical-core second-cladding-resin refractive index. The preceding subject matter of this paragraph characterizes example 74 of the present disclosure, wherein example 74 also includes the subject matter according to example 72 or 73, above.

Again, because second partial-length-optical-core cladding resin 164 has a refractive index less than that of resin 124, electromagnetic radiation 118 will be permitted to exit second partial-length-optical-core cladding resin 164 to penetrate and cure resin 124 when feedstock line 100 is being used to additively manufacture object 136.

Referring generally to, e.g., FIG. 12, according to method 300, partial-length peripheral surface 144 of partial-length optical core 138 of each of partial-length optical waveguides 122 has a surface roughness that is selected such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144. The preceding subject matter of this paragraph characterizes example 75 of the present disclosure, wherein example 75 also includes the subject matter according to example 70, above.

As discussed, rather than relying on refractive-index properties of a cladding to ensure desired dispersal of electromagnetic radiation 118 from partial-length optical core 138 via partial-length peripheral surface 144, the surface roughness of partial-length peripheral surface 144 is selected such that electromagnetic radiation 118 exits partial-length optical core 138 at desired amounts along the length of partial-length peripheral surface 144. Again, the surface roughness may create regions of internal reflection of electromagnetic radiation 118 within partial-length optical core 138 and may create regions where electromagnetic radiation 118 is permitted to escape partial-length optical core 138.

Referring generally to, e.g., FIG. 12, according to method 300, each of partial-length optical waveguides 122 is devoid of any cladding that covers partial-length optical core 138. The preceding subject matter of this paragraph characterizes example 76 of the present disclosure, wherein example 76 also includes the subject matter according to example 75, above.

As discussed, partial-length optical waveguides 122 without any cladding may be less expensive to manufacture than partial-length optical waveguides 122 with cladding. Additionally, the difference of refractive indexes between a cladding and resin 124 need not be taken into account when selecting resin 124 for feedstock line 100.

Referring generally to, e.g., FIGS. 15-17, according to method 300, optical direction modifiers 123 comprise optical direction-modifying particles 186. Optical direction-modifying particles 186 are configured to at least one of reflect, refract, diffract, or Rayleigh-scatter electromagnetic radiation 118, incident on outer surface 184 of any one of optical direction-modifying particles 186, to disperse electromagnetic radiation 118. The preceding subject matter of this paragraph characterizes example 77 of the present disclosure, wherein example 77 also includes the subject matter according to any one of examples 68 to 76, above.

Again, inclusion of optical direction-modifying particles 186 that at least one of reflect, refract, diffract, or Rayleigh-scatter electromagnetic radiation 118 provides for further dispersion of electromagnetic radiation 118 within interior volume 182 for irradiation of resin 124 therein when feedstock line 100 is being used to additively manufacture object 136. Moreover, because they are particles, optical direction-modifying particles 186 more easily are interspersed among elongate filaments 104 when applied thereto. In addition, in some examples of feedstock line 100, they may be generally uniformly spaced throughout resin 124 within interior volume 182 and effectively scatter electromagnetic radiation 118 throughout interior volume 182 to penetrate among elongate filaments 104 and into the shadows cast by elongate filaments 104 when feedstock line 100 is being used to additively manufacture object 136. In other examples of feedstock line 100, optical direction-modifying particles 186 may have a gradient of concentration within interior volume 182.

Referring generally to, e.g., FIGS. 4, 6, 7, and 15-17, according to method 300, each of elongate filaments 104 has a minimum outer dimension. Each of optical direction-modifying particles 186 has a maximum outer dimension that is less than one-eighth the minimum outer dimension of any one of elongate filaments 104. The preceding subject matter of this paragraph characterizes example 78 of the present disclosure, wherein example 78 also includes the subject matter according to example 77, above.

Again, by having a maximum outer dimension that is less than one-eighth the minimum outer dimension of elongate filaments 104, optical direction-modifying particles 186 are easily dispersed among elongate filaments 104. Moreover, optical direction-modifying particles 186 may easily flow with resin 124 to operatively disperse optical direction-modifying particles 186 throughout feedstock line 100, including into the shadows of elongate filaments 104.

Referring generally to, e.g., FIGS. 15-17, according to method 300, each of optical direction-modifying particles 186 has a maximum outer dimension that is less than 1000 nm, 500 nm, 250 nm, or 200 nm. The preceding subject matter of this paragraph characterizes example 79 of the present disclosure, wherein example 79 also includes the subject matter according to example 77 or 78, above.

As discussed, typical reinforcement fibers for composite materials often have a diameter in the range of 5 to 8 microns. By having a maximum outer dimension that is less than 1000 nm (1 micron), 500 nm (0.5 micron), 250 nm (0.25 micron), or 200 nm (0.200 micron), optical direction-modifying particles 186 easily extend between typical sizes of elongate filaments 104. Moreover, optical direction-modifying particles 186 may easily flow with resin 124 to operatively disperse optical direction-modifying particles 186 throughout feedstock line 100, including into the shadows of elongate filaments 104.

Referring generally to, e.g., FIGS. 15-17, according to method 300, electromagnetic radiation 118 has a wavelength. Each of optical direction-modifying particles 186 has a minimum outer dimension that is greater than one-fourth the wavelength of electromagnetic radiation 118. The preceding subject matter of this paragraph characterizes example 80 of the present disclosure, wherein example 80 also includes the subject matter according to any one of examples 77 to 79, above.

Again, selecting a minimum outer dimension of optical direction-modifying particles 186 that is greater than one-fourth the wavelength of electromagnetic radiation 118 that will be used when additively manufacturing object 136 ensures that optical direction-modifying particles 186 will have the intended effect of causing electromagnetic radiation 118 to reflect, refract, or diffract upon hitting optical direction-modifying particles 186.

Referring generally to, e.g., FIGS. 15-17, according to method 300, each of optical direction-modifying particles 186 has a minimum outer dimension that is greater than or equal to 50 nm or that is greater than or equal to 100 nm. The preceding subject matter of this paragraph characterizes example 81 of the present disclosure, wherein example 81 also includes the subject matter according to any one of examples 77 to 80, above.

As discussed, ultra-violet light having a wavelength of about 400 nm is often used in connection with ultra-violet photopolymers. Accordingly, when resin 124 comprises or consists of a photopolymer, optical direction-modifying particles 186 having a minimum outer dimension that is greater than or equal to 100 nm ensures that optical direction-modifying particles 186 will have the intended effect of causing electromagnetic radiation 118 to reflect, refract, or diffract upon hitting optical direction-modifying particles 186. However, in other examples, a minimum outer dimension as low as 50 nm may be appropriate.

Referring generally to, e.g., FIGS. 1, 4, 6, and 7, according to method 300, in feedstock line 100, optical direction-modifying particles 186 comprise less than 10% by weight of resin 124, less than 5% by weight of resin 124, or less than 1% by weight of resin 124. The preceding subject matter of this paragraph characterizes example 82 of the present disclosure, wherein example 82 also includes the subject matter according to any one of examples 77 to 81, above.

As discussed, by limiting optical direction-modifying particles 186 to the referenced threshold percentages, resin 124 will operatively flow among elongate filaments 104 when elongate filaments 104 and optical direction-modifying particles 186 are being combined to create feedstock line 100. In addition, desired properties of resin 124, feedstock line 100, and ultimately object 136 will not be negatively impacted by the presence of optical direction-modifying particles 186.

Referring generally to, e.g., FIGS. 15-17, according to method 300, outer surfaces 184 of at least some of optical direction-modifying particles 186 are faceted. The preceding subject matter of this paragraph characterizes example 83 of the present disclosure, wherein example 83 also includes the subject matter according to any one of examples 77 to 82, above.

Again, by being faceted, outer surfaces 184 effectively scatter electromagnetic radiation 118.

Referring generally to, e.g., FIGS. 15-17, according to method 300, outer surfaces 184 of at least some of optical direction-modifying particles 186 have a surface roughness that is selected such that when electromagnetic radiation 118 strikes outer surfaces 184, electromagnetic radiation 118 is scattered. The preceding subject matter of this paragraph characterizes example 84 of the present disclosure, wherein example 84 also includes the subject matter according to any one of examples 77 to 83, above.

As discussed, having a surface roughness selected to scatter electromagnetic radiation 118 facilitates the operative irradiation of resin 124 throughout feedstock line 100, including into the shadows of elongate filaments 104, when feedstock line 100 is being used to additively manufacture object 136.

Referring generally to, e.g., FIGS. 4, 6, and 7, according to method 300, resin 124 has a resin refractive index. At least some of optical direction-modifying particles 186 have a particle refractive index. The particle refractive index is greater than or less than the resin refractive index. The preceding subject matter of this paragraph characterizes example 85 of the present disclosure, wherein example 85 also includes the subject matter according to any one of examples 77 to 84, above.

Again, when optical direction-modifying particles 186 have a refractive index that is different from the refractive index of resin 124, electromagnetic radiation 118 incident upon the outer surfaces thereof will necessarily leave the outer surfaces at a different angle, and thus will scatter throughout resin 124, including into the shadows of elongate filaments 104.

Referring generally to, e.g., FIG. 15, according to method 300, at least some of optical direction-modifying particles 186 are spherical. The preceding subject matter of this paragraph characterizes example 86 of the present disclosure, wherein example 86 also includes the subject matter according to any one of examples 77 to 85, above.

Again, by being spherical, optical direction-modifying particles 186 easily be positioned among elongate filaments 104 and may easily flow with resin 124 as elongate filaments 104 and optical direction-modifying particles 186 are being combined.

Referring generally to, e.g., FIG. 16, according to method 300, at least some of optical direction-modifying particles 186 are prismatic. The preceding subject matter of this paragraph characterizes example 87 of the present disclosure, wherein example 87 also includes the subject matter according to any one of examples 77 to 86, above.

Again, by being prismatic, optical direction-modifying particles 186 may be selected to operatively at least one of reflect, refract, or diffract electromagnetic radiation 118, as discussed herein.

Referring generally to, e.g., FIGS. 13 and 14, and particularly to FIG. 18, according to method 300, resin 124 is applied to cover elongate filaments 104 and optical direction modifiers 123, such that elongate filaments 104 and optical direction modifiers 123 are covered by resin 124 in derivative tow 209, at least one of before or after (block 302) separating precursor tow 208 into the individual ones of elongate filaments 104 or into subsets 214 of elongate filaments 104. The preceding subject matter of this paragraph characterizes example 88 of the present disclosure, wherein example 88 also includes the subject matter according to any one of examples 68 to 87, above.

In some implementations of method 300, applying resin 124 before precursor tow 208 is separated enables a corresponding system (e.g., system 200 herein) to regulate the amount of resin 124 on each individual one of elongate filaments 104 or subset 214 of elongate filaments 104. For example, when a screen or mesh is used to separate precursor tow 208, the screen or mesh may effectively scrape away excess resin 124 leaving only a desired amount on each individual one of elongate filaments 104 or subset 214 of elongate filaments 104.

On the other hand, in some implementations of method 300, applying resin 124 after precursor tow 208 is separated enables a sufficient amount of resin 124 to fully wet elongate filaments 104 and optical direction modifiers 123.

In some implementations of method 300, resin 124 may be applied both before and after precursor tow 208 is separated.

Referring generally to, e.g., FIGS. 13 and 14, and particularly to FIG. 18, according to method 300, the step of (block 302) separating precursor tow 208 into individual ones of elongate filaments 104 or into subsets 214 of elongate filaments 104 comprises (block 310) imparting a first electrical charge to elongate filaments 104. Also according to method 300, the step of (block 308) applying resin 124 to cover elongate filaments 104 and optical direction modifiers 123 such that elongate filaments 104 and optical direction modifiers 123 are covered by resin 124 in derivative tow 209 comprises (block 312) imparting a second electrical charge to resin 124. The second electrical charge and the first electrical charge have opposite signs. The preceding subject matter of this paragraph characterizes example 89 of the present disclosure, wherein example 89 also includes the subject matter according to any one of examples 68 to 88, above.

As discussed in connection with system 200, by imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to, e.g., FIG. 14, and particularly to FIG. 18, according to method 300, the step of (block 306) combining optical direction modifiers 123 with the individual ones of elongate filaments 104 or subsets 214 of elongate filaments 104 into derivative tow 209 so that optical direction modifiers 123 are interspersed among elongate filaments 104 comprises (block 314) combining the individual ones of elongate filaments 104 and at least one full-length optical waveguide 102 or subsets 214 of elongate filaments 104 and at least one full-length optical waveguide 102 into derivative tow 209 so that each of elongate filaments 104 and at least one full-length optical waveguide 102 extends along all of the feedstock-line length and at least one full-length optical waveguide 102 is interspersed among elongate filaments 104. Also according to method 300, the step of (block 308) applying resin 124 to cover elongate filaments 104 and optical direction modifiers 123 such that elongate filaments 104 and optical direction modifiers 123 are covered by resin 124 in derivative tow 209 comprises (block 316) applying resin 124 to cover at least one full-length optical waveguide 102 in derivative tow 209. The preceding subject matter of this paragraph characterizes example 90 of the present disclosure, wherein example 90 also includes the subject matter according to any one of examples 68 to 89, above.

As discussed, inclusion of at least one full-length optical waveguide 102 in feedstock line 100 further facilitates penetration of electromagnetic radiation 118 into interior volume 182 of feedstock line 100 for irradiation of resin 124, despite regions of resin 124 being in the shadows of elongate filaments 104 cast by the direct (i.e., line-of-sight) application of electromagnetic radiation 118.

Referring generally to, e.g., FIG. 13, and particularly to FIG. 18, according to method 300, resin 124 is applied to cover elongate filaments 104 and at least one full-length optical waveguide 102, such that elongate filaments 104 and at least one full-length optical waveguide 102 are covered by resin 124 in derivative tow 209, at least one of before or after (block 314) combining the individual ones of elongate filaments 104 or subsets 214 of elongate filaments 104 and at least one full-length optical waveguide 102 into derivative tow 209. The preceding subject matter of this paragraph characterizes example 91 of the present disclosure, wherein example 91 also includes the subject matter according to example 90, above.

In some implementations of method 300, applying resin 124 before elongate filaments 104 and full-length optical waveguide(s) are combined enables a sufficient amount of resin 124 to fully wet elongate filaments 104 and full-length optical waveguide(s).

In some implementations of method 300, applying resin 124 after elongate filaments 104 and full-length optical waveguide(s) are combined into derivative tow 209 ensures that feedstock line 100 has the overall desired amount of resin 124 therein.

In some implementations of method 300, resin 124 may be applied both before and after elongate filaments 104 and full-length optical waveguide(s) are combined.

Referring generally to, e.g., FIGS. 2 and 9-12, according to method 300, at least one full-length optical waveguide 102 comprises full-length optical core 110. Full-length optical core 110 comprises first full-length-optical-core end face 112, second full-length-optical-core end face 114, opposite first full-length-optical-core end face 112, and full-length peripheral surface 116, extending between first full-length-optical-core end face 112 and second full-length-optical-core end face 114. At least one full-length optical waveguide 102 is configured such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116. The preceding subject matter of this paragraph characterizes example 92 of the present disclosure, wherein example 92 also includes the subject matter according to example 90 or 91, above.

Again, when feedstock line 100 is used to additively manufacture object 136 with in situ curing thereof (i.e., with electromagnetic radiation 118 entering full-length optical core 110), at least a portion of electromagnetic radiation 118 will be emitted from full-length optical core 110 at a position that is spaced-apart from where it entered full-length optical core 110. As a result, electromagnetic radiation may be dispersed throughout interior volume 182 of feedstock line 100 for operative irradiation of resin 124.

Referring generally to, e.g., FIGS. 2 and 9-12, according to method 300, at least one full-length optical waveguide 102 is configured such that when electromagnetic radiation 118 enters first full-length-optical-core end face 112 of full-length optical core 110, an initial portion of electromagnetic radiation 118 exits full-length optical core 110 via full-length peripheral surface 116 and a final portion of electromagnetic radiation 118, remaining in full-length optical core 110 after the initial portion of electromagnetic radiation 118 exits full-length optical core 110, exits full-length optical core 110 via second full-length-optical-core end face 114. The preceding subject matter of this paragraph characterizes example 93 of the present disclosure, wherein example 93 also includes the subject matter according to example 92, above.

As discussed, in some examples of feedstock line 100, if electromagnetic radiation 118 enters first full-length-optical-core end face 112, it will exit both full-length peripheral surface 116 and second full-length-optical-core end face 114, as opposed, for example, to electromagnetic radiation 118 being fully emitted via full-length peripheral surface 116. Such examples of feedstock line 100 are well suited for additive manufacturing systems and methods in which electromagnetic radiation 118 is directed at first full-length-optical-core end face 112 as feedstock line 100 is being constructed and as object 136 is being manufactured.

Referring generally to, e.g., FIGS. 2 and 9-12, according to method 300, at least one full-length optical waveguide 102 is configured such that the initial portion of electromagnetic radiation 118, which exits full-length optical core 110 via full-length peripheral surface 116, is greater than or equal to the final portion of electromagnetic radiation 118, which exits full-length optical core 110 via second full-length-optical-core end face 114. The preceding subject matter of this paragraph characterizes example 94 of the present disclosure, wherein example 94 also includes the subject matter according to example 93, above.

Again, in such configurations of at least one full-length optical waveguide 102, it is ensured that a desired amount of electromagnetic radiation 118 exits full-length optical core 110 via full-length peripheral surface 116 to operatively cure resin 124 among elongate filaments 104 within interior volume 182 of feedstock line 100 when feedstock line 100 is used to additively manufacture object 136.

Referring generally to, e.g., FIGS. 2 and 9-11, according to method 300, full-length optical core 110 has a full-length-optical-core refractive index. At least one full-length optical waveguide 102 further comprises full-length-optical-core cladding 154, at least partially covering full-length optical core 110. Full-length-optical-core cladding 154 comprises at least first full-length-optical-core cladding resin 156, having a full-length-optical-core first-cladding-resin refractive index. Full-length-optical-core cladding 154 is non-uniform along at least one full-length optical waveguide 102. The full-length-optical-core refractive index is greater than the full-length-optical-core first-cladding-resin refractive index. The preceding subject matter of this paragraph characterizes example 95 of the present disclosure, wherein example 95 also includes the subject matter according to any one of examples 92 to 94, above.

Again, by full-length-optical-core cladding 154 being non-uniform along the length of at least one full-length optical waveguide 102, electromagnetic radiation 118 is permitted to exit full-length optical core 110 via full-length peripheral surface 116. Moreover, by first full-length-optical-core cladding resin 156 having a refractive index that is less than that of full-length optical core 110, electromagnetic radiation 118, upon entering full-length optical core 110, is trapped within full-length optical core 110 other than the regions where first full-length-optical-core cladding resin 156 is not present. As a result, at least one full-length optical waveguide 102 may be constructed to provide a desired amount of electromagnetic radiation 118, exiting various positions along full-length peripheral surface 116, such as to ensure a desired amount of electromagnetic radiation 118, penetrating the shadows of elongate filaments 104 when feedstock line 100 is used to additively manufacture object 136.

Referring generally to, e.g., FIGS. 2, 10, and 11, according to method 300, full-length peripheral surface 116 has full-length-peripheral-surface regions 127 devoid of first full-length-optical-core cladding resin 156. Full-length-optical-core cladding 154 further comprises second full-length-optical-core cladding resin 158, having a full-length-optical-core second-cladding-resin refractive index. Second full-length-optical-core cladding resin 158 covers full-length-peripheral-surface regions 127 of full-length peripheral surface 116. The full-length-optical-core second-cladding-resin refractive index is greater than the full-lengthoptical-core first-cladding-resin refractive index. The preceding subject matter of this paragraph characterizes example 96 of the present disclosure, wherein example 96 also includes the subject matter according to example 95, above.

Again, by covering full-length-peripheral-surface regions 127 with second full-length-optical-core cladding resin 158, a desired refractive index thereof may be selected to optimize how electromagnetic radiation 118 exits full-length peripheral surface 116. Additionally or alternatively, with full-length-peripheral-surface regions 127 covered with second full-length-optical-core cladding resin 158, the integrity of first full-length-optical-core cladding resin 156 may be ensured, such that it does not peel or break off during storage of at least one full-length optical waveguide 102 and during implementation of method 300.

Referring generally to, e.g., FIGS. 2 and 11, according to method 300, second full-length-optical-core cladding resin 158 also covers first full-length-optical-core cladding resin 156. The preceding subject matter of this paragraph characterizes example 97 of the present disclosure, wherein example 97 also includes the subject matter according to example 96, above.

As discussed, full-length optical waveguides, such as according to example 97, may be more easily manufactured, in that full-length optical core 110 with first full-length-optical-core cladding resin 156 simply may be fully coated with second full-length-optical-core cladding resin 158. Additionally or alternatively, the integrity of full-length optical waveguides may be maintained during storage thereof and during implementation of method 300.

Referring generally to, e.g., FIGS. 2, 10, and 11, according to method 300, resin 124 has a resin refractive index. The resin refractive index is greater than the full-length-optical-core second-cladding-resin refractive index. The preceding subject matter of this paragraph characterizes example 98 of the present disclosure, wherein example 98 also includes the subject matter according to example 96 or 97, above.

As discussed, because second full-length-optical-core cladding resin 158 has a refractive index less than that of resin 124, electromagnetic radiation 118 will be permitted to exit second full-length-optical-core cladding resin 158 to penetrate and cure resin 124 when feedstock line 100 is used to additively manufacture object 136.

Referring generally to, e.g., FIGS. 2 and 12, according to method 300, full-length peripheral surface 116 has a surface roughness that is selected such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116. The preceding subject matter of this paragraph characterizes example 99 of the present disclosure, wherein example 99 also includes the subject matter according to any one of examples 92 to 94, above.

As discussed, rather than relying on refractive-index properties of a cladding to ensure desired dispersal of electromagnetic radiation 118 from full-length optical core 110 via full-length peripheral surface 116, the surface roughness of full-length peripheral surface 116 is selected such that electromagnetic radiation 118 exits full-length optical core 110 at desired amounts along the length of full-length peripheral surface 116. For example, the surface roughness may create regions of internal reflection of electromagnetic radiation 118 within full-length optical core 110 and may create regions where electromagnetic radiation 118 is permitted to escape full-length optical core 110.

Referring generally to, e.g., FIGS. 2 and 12, according to method 300, at least one full-length optical waveguide 102 is devoid of any cladding that covers full-length optical core 110. The preceding subject matter of this paragraph characterizes example 100 of the present disclosure, wherein example 100 also includes the subject matter according to example 99, above.

As discussed, full-length optical waveguides without any cladding may be less expensive to manufacture than full-length optical waveguides with cladding. Additionally, the difference of refractive indexes between a cladding and resin 124 need not be taken into account when selecting resin 124 for feedstock line 100.

Referring generally to, e.g., FIG. 14, and particularly to FIG. 18, according to method 300, the step of (block 314) combining the individual ones of elongate filaments 104 and at least one full-length optical waveguide 102 or subsets 214 of elongate filaments 104 and at least one full-length optical waveguide 102 into derivative tow 209 comprises (block 318) at least one of twisting, weaving, or braiding the individual ones of elongate filaments 104 and at least one full-length optical waveguide 102, or subsets 214 of elongate filaments 104 and at least one full-length optical waveguide 102, into derivative tow 209. The preceding subject matter of this paragraph characterizes example 101 of the present disclosure, wherein example 101 also includes the subject matter according to any one of examples 90 to 100, above.

Again, by being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongated filaments 104 when feedstock line 100 is used to additively manufacture object 136.

Referring generally to FIG. 3 and particularly to, e.g., FIGS. 9-12, optical waveguide 108 is disclosed. Optical waveguide 108 comprises optical core 146, comprising first end face 148, second end face 150, opposite first end face 148, and peripheral surface 152, extending between first end face 148 and second end face 150. Optical waveguide 108 is configured such that when electromagnetic radiation 118 enters optical core 146 via at least one of first end face 148, second end face 150, or peripheral surface 152, at least a portion of electromagnetic radiation 118 exits optical core 146 via peripheral surface 152. The preceding subject matter of this paragraph characterizes example 102 of the present disclosure.

Because optical waveguide 108 is configured for electromagnetic radiation to enter optical core 146 via any one of first end face 148, second end face 150, or peripheral surface 152 and then exit optical core 146 via peripheral surface 152, optical waveguide 108 is well suited for inclusion in a photopolymer resin (e.g., resin 124 herein) of a feedstock line (e.g., feedstock line 100 here) that also includes reinforcing fibers (e.g., elongate filaments 104 herein) and that is used to additively manufacture an object (e.g., object 136 herein). More specifically, inclusion of at least one optical waveguide 108 in such a feedstock line facilitates penetration of electromagnetic radiation 118 into the interior volume of the feedstock line for irradiation of the resin, despite regions of the resin being in the shadows of the reinforcing fibers cast by the direct (i.e., line-of-sight) application of electromagnetic radiation 118. In other words, even when electromagnetic radiation 118 is shielded from directly reaching all regions of the resin, at least one optical waveguide 108 will receive electromagnetic radiation 118 via one or more of first end face 148, second end face 150, or peripheral surface 152, and disperse electromagnetic radiation 118 via at least peripheral surface 152 to indirectly reach regions of the resin. As a result, the feedstock line may be more easily cured with electromagnetic radiation 118, may be more evenly cured with electromagnetic radiation 118, may be more thoroughly cured with electromagnetic radiation 118, and/or may be more quickly cured with electromagnetic radiation 118. Such a configuration of feedstock line is particularly well suited for additive manufacturing of the fused filament fabrication variety, in which the feedstock line is dispensed by a print head, or nozzle, and a source of curing energy (e.g., electromagnetic radiation 118) directs the curing energy at the feedstock line as it is being dispensed to cure the resin in situ.

Full-length optical waveguides and partial-length optical waveguides are examples of optical waveguides, such as optical waveguide 108.

Referring generally to FIG. 3 and particularly to, e.g., FIGS. 9-12, optical waveguide 108 is configured such that when electromagnetic radiation 118 enters first end face 148 of optical core 146, an initial portion of electromagnetic radiation 118 exits optical core 146 via peripheral surface 152 and a final portion of electromagnetic radiation 118, remaining in optical core 146 after the initial portion of electromagnetic radiation 118 exits optical core 146, exits optical core 146 via second end face 150. The preceding subject matter of this paragraph characterizes example 103 of the present disclosure, wherein example 103 also includes the subject matter according to example 102, above.

That is, when electromagnetic radiation 118 enters first end face 148, it will exit both peripheral surface 152 and second end face 150, as opposed, for example, to electromagnetic radiation 118 being fully emitted via peripheral surface 152. Such examples of optical waveguide 108 are well suited for inclusion in feedstock lines with additive manufacturing systems and methods in which electromagnetic radiation 118 is directed at first end face 148 as the feedstock line is being constructed and as an object is being manufactured. That is, an additive manufacturing system may be configured to construct a feedstock line while the object is being manufactured from the feedstock line, and while electromagnetic radiation 118 is entering first end face 148. Because electromagnetic radiation 118 exits not only peripheral surface 152, but also second end face 150, it is ensured that sufficient electromagnetic radiation 118 travels the full length of optical waveguide 108 to operatively cure the resin of the feedstock line that is in the shadows of the reinforcing fibers.

Referring generally to FIG. 3 and particularly to, e.g., FIGS. 9-12, optical waveguide 108 is configured such that the initial portion of electromagnetic radiation 118, which exits optical core 146 via peripheral surface 152, is greater than or equal to the final portion of electromagnetic radiation 118, which exits optical core 146 via second end face 150. The preceding subject matter of this paragraph characterizes example 104 of the present disclosure, wherein example 104 also includes the subject matter according to example 103, above.

In such configurations, it is ensured that a desired amount of electromagnetic radiation 118 exits optical core 146 via peripheral surface 152 to operatively cure the resin of a feedstock line that is in the shadows of the reinforcing fibers, when the feedstock line is utilized by an additive manufacturing system or in an additive manufacturing method.

Referring generally to FIG. 3 and particularly to, e.g., FIGS. 9-11, optical core 146 has an optical-core refractive index. Optical waveguide 108 further comprises cladding 120, at least partially covering optical core 146. Cladding 120 comprises at least first resin 132, having a first-resin refractive index. Cladding 120 is non-uniform along optical waveguide 108. The optical-core refractive index is greater than the first-resin refractive index. The preceding subject matter of this paragraph characterizes example 105 of the present disclosure, wherein example 105 also includes the subject matter according to any one of examples 102 to 104, above.

By cladding 120 being non-uniform along the length of optical waveguide 108, electromagnetic radiation 118 is permitted to exit optical core 146 via peripheral surface 152. Moreover, by first resin 132 having a refractive index that is less than that of optical core 146, electromagnetic radiation 118, upon entering optical core 146, is trapped within optical core 146 other than the regions where first resin 132 is not present. As a result, optical waveguide 108 may be constructed to provide a desired amount of electromagnetic radiation 118, exiting various positions along peripheral surface 152, such as to ensure a desired amount of electromagnetic radiation 118, penetrating the shadows of reinforcing fibers when optical waveguide 108 is included in a feedstock line that is used to additively manufacture an object.

Referring generally to FIG. 3 and particularly to, e.g., FIGS. 10 and 11, peripheral surface 152 has regions 130 devoid of first resin 132. Cladding 120 further comprises second resin 134, having a second-resin refractive index. Second resin 134 contacts regions 130 of peripheral surface 152. The second-resin refractive index is greater than the first-resin refractive index. The preceding subject matter of this paragraph characterizes example 106 of the present disclosure, wherein example 106 also includes the subject matter according to example 105, above.

By covering regions 130 with second resin 134, a desired refractive index thereof may be selected to optimize how electromagnetic radiation 118 exits peripheral surface 152. Additionally or alternatively, with regions 130 covered with second resin 134, the integrity of first resin 132 may be ensured, such that it does not peel or break off during storage of optical waveguide 108 and during construction of an associated feedstock line.

Referring generally to FIG. 3 and particularly to, e.g., FIG. 11, second resin 134 covers first resin 132. The preceding subject matter of this paragraph characterizes example 107 of the present disclosure, wherein example 107 also includes the subject matter according to example 106, above.

Optical waveguides, such as optical waveguide 108, may be more easily manufactured, in that optical core 146 with first resin 132 simply may be fully coated with second resin 134. Additionally or alternatively, the integrity of optical waveguides may be maintained during storage thereof and during construction of an associated feedstock line.

Referring generally to FIG. 3 and particularly to, e.g., FIG. 12, peripheral surface 152 has a surface roughness that is selected such that when electromagnetic radiation 118 enters optical core 146 via at least one of first end face 148, second end face 150, or peripheral surface 152, at least a portion of electromagnetic radiation 118 exits optical core 146 via peripheral surface 152. The preceding subject matter of this paragraph characterizes example 108 of the present disclosure, wherein example 108 also includes the subject matter according to any one of examples 102 to 104, above.

Rather than relying on refractive index properties of a cladding to ensure desired dispersal of electromagnetic radiation 118 from optical core 146 via peripheral surface 152, the surface roughness of peripheral surface 152 is selected such that electromagnetic radiation 118 exits optical core 146 at desired amounts along the length of peripheral surface 152. For example, the surface roughness may create regions of internal reflection of electromagnetic radiation 118 within optical core 146 and may create regions where electromagnetic radiation 118 is permitted to escape optical core 146.

Referring generally to FIG. 3 and particularly to, e.g., FIG. 12, optical waveguide 108 is devoid of any cladding that covers optical core 146. The preceding subject matter of this paragraph characterizes example 109 of the present disclosure, wherein example 109 also includes the subject matter according to example 108, above.

Optical waveguides without any cladding may be less expensive to manufacture than optical waveguides with cladding. Additionally, the difference of refractive indexes between a cladding and a resin of a feedstock line need not be taken into account when selecting the resin for the feedstock line.

Referring generally to, e.g., FIGS. 3, 8, and 9, and particularly to FIG. 19, method 400 of modifying optical fiber 126 to create optical waveguide 108 is disclosed. Optical fiber 126 comprises optical core 146, having an optical-core refractive index, and cladding 120, comprising at least first resin 132, having a first-resin refractive index that is less than the optical-core refractive index. Cladding 120 covers peripheral surface 152 of optical core 146 and extends between first end face 148 and second end face 150 of optical core 146. Method 400 comprises a step of (block 402) removing portions 128 of cladding 120 to expose regions 130 of peripheral surface 152, such that at least a portion of electromagnetic radiation 118, entering optical core 146 via at least one of first end face 148, second end face 150, or peripheral surface 152, exits optical core 146 via regions 130 of peripheral surface 152. The preceding subject matter of this paragraph characterizes example 110 of the present disclosure.

Method 400 provides an inexpensive process for creating optical waveguide 108. For example, an off-the-shelf cladded optical fiber may be used as optical fiber 126, and portions 128 of cladding 120 simply may be removed at regions 130 that are appropriately spaced apart to result in the desired functions of optical waveguide 108, discussed herein.

Any suitable process may be utilized to remove portion 128 of cladding 120, including, for example, mechanical processes, chemical processes, thermal processes (e.g., utilizing a laser), etc.

Referring generally to, e.g., FIGS. 3 and 8-11, and particularly to FIG. 19, method 400 further comprises a step of (block 404) applying second resin 134 to contact regions 130 of peripheral surface 152. Second resin 134 has a second-resin refractive index that is greater than the first-resin refractive index. The preceding subject matter of this paragraph characterizes example 111 of the present disclosure, wherein example 111 also includes the subject matter according to example 110, above.

As discussed, by covering regions 130 with second resin 134, a desired refractive index thereof may be selected to optimize how electromagnetic radiation 118 exits peripheral surface 152. Additionally or alternatively, with regions 130 covered with second resin 134, the integrity of first resin 132 may be ensured, such that it does not peel or break off during storage of optical waveguide 108 and during construction of an associated feedstock line.

Referring generally to, e.g., FIGS. 3, 8, 9, and 11, and particularly to FIG. 19, according to method 400, the step of (block 404) applying second resin 134 to contact regions 130 of peripheral surface 152 comprises (block 406) covering first resin 132 with second resin 134. The preceding subject matter of this paragraph characterizes example 112 of the present disclosure, wherein example 112 also includes the subject matter according to example 111, above.

Applying second resin 134 such that it also covers first resin 132 may be an easier and less-expensive process than applying second resin 134 only to contact and cover regions 130.

Referring generally to, e.g., FIGS. 3 and 9, and particularly to FIG. 20, method 500 of modifying optical core 146 to create optical waveguide 108 is disclosed. Optical core 146 comprises first end face 148, second end face 150, opposite first end face 148, and peripheral surface 152, extending between first end face 148 and second end face 150. Method 500 comprises a step of (block 502) applying first resin 132 to peripheral surface 152 of optical core 146 so that regions 130 of peripheral surface 152 remain uncovered by first resin 132. First resin 132 has a first-resin refractive index. Optical core 146 has an optical-core refractive index that is greater than the first-resin refractive index. At least a portion of electromagnetic radiation 118, entering optical core 146 via at least one of first end face 148, second end face 150, or peripheral surface 152, exits optical core 146 via peripheral surface 152. The preceding subject matter of this paragraph characterizes example 113 of the present disclosure.

Method 500 provides an inexpensive process for creating optical waveguide 108. For example, an off-the-shelf non-cladded optical fiber may be used as optical core 146, and first resin 132 may be applied to peripheral surface 152 thereof.

Any suitable process for applying first resin 132 may be used, including, for example spraying, misting, or splattering first resin 132 on peripheral surface 152, such that regions 130 of peripheral surface 152 remain uncovered by first resin 132.

Referring generally to, e.g., FIGS. 3 and 9-11, and particularly to FIG. 20, method 500 further comprises a step of (block 504) applying second resin 134 to contact regions 130 of peripheral surface 152 to create with first resin 132 cladding 120 that covers peripheral surface 152 of optical core 146. Second resin 134 has a second-resin refractive index that is greater than the first-resin refractive index. The preceding subject matter of this paragraph characterizes example 114 of the present disclosure, wherein example 114 also includes the subject matter according to example 113, above.

Similar to method 400, by covering regions 130 with second resin 134, a desired refractive index thereof may be selected to optimize how electromagnetic radiation 118 exits peripheral surface 152. Additionally or alternatively, with regions 130 covered with second resin 134, the integrity of first resin 132 may be ensured, such that it does not peel or break off during storage of optical waveguide 108 and during construction of an associated feedstock line.

Referring generally to, e.g., FIGS. 3, 9, and 11, and particularly to FIG. 20, according to method 500, the step of (block 504) applying second resin 134 to contact regions 130 of peripheral surface 152 comprises (block 506) covering first resin 132 with second resin 134. The preceding subject matter of this paragraph characterizes example 115 of the present disclosure, wherein example 115 also includes the subject matter according to example 114, above.

Again, applying second resin 134 such that it also covers first resin 132 may be an easier and less-expensive process than applying second resin 134 only to contact and cover regions 130.

Referring generally to, e.g., FIGS. 3 and 12, and particularly to FIG. 21, method 600 of modifying optical core 146 to create optical waveguide 108 is disclosed. Optical core 146 comprises first end face 148, second end face 150, opposite first end face 148, and peripheral surface 152, extending between first end face 148 and second end face 150. Method 600 comprises a step of (block 602) increasing surface roughness of all or portions of peripheral surface 152 of optical core 146 so that at least a portion of electromagnetic radiation 118, entering optical core 146 via at least one of first end face 148, second end face 150, or peripheral surface 152, exits optical core 146 via peripheral surface 152. The preceding subject matter of this paragraph characterizes example 116 of the present disclosure.

Method 600 provides an inexpensive process for creating optical waveguide 108. For example, an off-the-shelf non-cladded optical fiber may be used as optical core 146, and peripheral surface 152 thereof may be roughened.

Any suitable process for increasing surface roughness of peripheral surface may be used including, for example, mechanical processes, chemical processes, thermal processes (e.g., utilizing a laser), etc.

Referring generally to, e.g., FIGS. 3 and 12, and particularly to FIG. 21, method 600 further comprises (block 604) applying cladding 120 to cover peripheral surface 152. Optical core 146 has an optical-core refractive index. Cladding 120 has a cladding refractive index. The optical-core refractive index is less than the cladding refractive index. The preceding subject matter of this paragraph characterizes example 117 of the present disclosure, wherein example 117 also includes the subject matter according to example 116, above.

By applying cladding 120 to cover peripheral surface 152, the integrity of the surface roughness of peripheral surface 152 may be maintained, and by selecting a cladding refractive index that is less than the optical-core refractive index ensures that electromagnetic radiation 118 can operatively exit optical core 146 at desired locations as a result of the surface roughness of peripheral surface 152.

Examples of the present disclosure may be described in the context of aircraft manufacturing and service method 1100 as shown in FIG. 22 and aircraft 1102 as shown in FIG. 23. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 23, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings. Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A system for creating a feedstock line for additive manufacturing of an object, the feedstock line having a feedstock-line length, the system comprising:
   a filament supply, configured to dispense a precursor tow, comprising elongate filaments;

a filament separator, configured to separate the precursor tow, dispensed from the filament supply, into individual ones of the elongate filaments or into subsets of the elongate filaments, wherein each of the subsets comprises a plurality of the elongate filaments;

an optical-direction-modifier supply, configured to dispense optical direction modifiers to be applied to the individual ones of the elongate filaments or the subsets of the elongate filaments, originating from the filament separator, wherein each of the optical direction modifiers has an outer surface, and each of the optical direction modifiers is configured such that when electromagnetic radiation strikes the outer surface from a first direction, at least a portion of the electromagnetic radiation departs the outer surface in a second direction that is at an angle to the first direction;

a combiner, configured to combine the individual ones of the elongate filaments and the optical direction modifiers, dispensed by the optical-direction-modifier supply, or the subsets of the elongate filaments and the optical direction modifiers, dispensed by the optical-direction-modifier supply, into a derivative tow so that the optical direction modifiers are interspersed among the elongate filaments; and a resin supply, configured to provide a resin to be applied to at least one of the precursor tow, dispensed from the filament supply, the individual ones of the elongate filaments or the subsets of the elongate filaments, originating from the filament separator, the optical direction modifiers, dispensed from the optical-direction-modifier supply, or the derivative tow, originating from the combiner, such that the elongate filaments and the optical direction modifiers in the derivative tow are covered with the resin.

2. The system according to claim 1, wherein the elongate filaments are opaque to electromagnetic radiation.

3. The system according to claim 1, wherein:
the optical direction modifiers comprise partial-length optical waveguides;
each of the partial-length optical waveguides comprises a partial-length optical core;
the partial-length optical core of each of the partial-length optical waveguides comprises a first partial-length-optical-core end face, a second partial-length-optical-core end face, opposite the first partial-length-optical-core end face, and a partial-length peripheral surface, extending between the first partial-length-optical-core end face and the second partial-length-optical-core end face; and
each of the partial-length optical waveguides is configured such that when the electromagnetic radiation enters the partial-length optical core via at least one of the first partial-length-optical-core end face, the second partial-length-optical-core end face, or the partial-length peripheral surface, at least a portion of the electromagnetic radiation exits the partial-length optical core via the partial-length peripheral surface.

4. The system according to claim 3, wherein:
the partial-length optical core has a partial-length-optical-core refractive index;
each of the partial-length optical waveguides further comprises a partial-length-optical-core cladding, at least partially covering the partial-length optical core;
the partial-length-optical-core cladding comprises at least a first partial-length-optical-core cladding resin, having a partial-length-optical-core first-cladding-resin refractive index;

the partial-length-optical-core cladding is non-uniform along each of the partial-length optical waveguides; and
the partial-length-optical-core refractive index is greater than the partial-length-optical-core first-cladding-resin refractive index.

5. The system according to claim 4, wherein:
the partial-length peripheral surface of the partial-length optical core of each of the partial-length optical waveguides has partial-length-peripheral-surface regions devoid of the first partial-length-optical-core cladding resin;
the partial-length-optical-core cladding further comprises a second partial-length-optical-core cladding resin, having a partial-length-optical-core second-cladding-resin refractive index;
the second partial-length-optical-core cladding resin covers the partial-length-peripheral-surface regions of the partial-length peripheral surface; and
the partial-length-optical-core second-cladding-resin refractive index is greater than the partial-length-optical-core first-cladding-resin refractive index.

6. The system according to claim 5, wherein:
the resin has a resin refractive index; and
the resin refractive index is greater than the partial-length-optical-core second-cladding-resin refractive index.

7. The system according to claim 3, wherein the partial-length peripheral surface of the partial-length optical core of each of the partial-length optical waveguides has a surface roughness that is selected such that when electromagnetic radiation enters the partial-length optical core via at least one of the first partial-length-optical-core end face, the second partial-length-optical-core end face, or the partial-length peripheral surface, at least a portion of the electromagnetic radiation exits the partial-length optical core via the partial-length peripheral surface.

8. The system according to claim 1, wherein:
the optical direction modifiers comprise optical direction-modifying particles; and
the optical direction-modifying particles are configured to at least one of reflect, refract, diffract, or Rayleigh-scatter the electromagnetic radiation, incident on the outer surface of any one of the optical direction-modifying particles to disperse the electromagnetic radiation.

9. The system according to claim 8, wherein:
each of the elongate filaments has a minimum outer dimension; and
each of the optical direction-modifying particles has a maximum outer dimension that is less than one-eighth the minimum outer dimension of any one of the elongate filaments.

10. The system according to claim 8, wherein each of the optical direction-modifying particles has a maximum outer dimension that is less than 1000 nm.

11. The system according to claim 8, wherein:
the electromagnetic radiation has a wavelength; and
each of the optical direction-modifying particles has a minimum outer dimension that is greater than one-fourth the wavelength of the electromagnetic radiation.

12. The system according to claim 8, wherein each of the optical direction-modifying particles has a minimum outer dimension that is greater than or equal to 50 nm.

13. The system according to claim 8, wherein in the feedstock line, the optical direction-modifying particles comprise less than 10% by weight of the resin.

14. The system according to claim 8, wherein the outer surfaces of at least some of the optical direction-modifying particles are faceted.

15. The system according to claim 8, wherein the outer surfaces of at least some of the optical direction-modifying particles have a surface roughness that is selected such that when electromagnetic radiation strikes the outer surfaces, the electromagnetic radiation is scattered.

16. The system according to claim 8, wherein:
the resin has a resin refractive index;
at least some of the optical direction-modifying particles have a particle refractive index; and
the particle refractive index is greater than or less than the resin refractive index.

17. The system according to claim 8, wherein at least some of the optical direction-modifying particles are prismatic.

18. The system according to claim 1, wherein the optical-direction-modifier supply and the resin supply together form a combined supply, configured to dispense the optical direction modifiers together with the resin.

19. The system according to claim 1, wherein:
the filament separator is configured to impart a first electrical charge to the elongate filaments as the precursor tow is separated into the individual ones of the elongate filaments or into the subsets of the elongate filaments;
the resin supply is configured to impart a second electrical charge to the resin when the resin is applied to at least one of the individual ones of the elongate filaments or the subsets of the elongate filaments and originating from the filament separator, or the derivative tow, originating from the combiner, such that the elongate filaments and the optical direction modifiers in the derivative tow are covered with the resin; and
the second electrical charge and the first electrical charge have opposite signs.

20. A method of creating a feedstock line for additive manufacturing of an object, the feedstock line having a feedstock-line length, the method comprising steps of:
separating a precursor tow, comprising elongate filaments, into individual ones of the elongate filaments or into subsets of the elongate filaments, wherein each of the subsets comprises a plurality of the elongate filaments;
applying optical direction modifiers to the individual ones of the elongate filaments or to the subsets of the elongate filaments, wherein each of the optical direction modifiers has an outer surface, and wherein each of the optical direction modifiers is configured such that when electromagnetic radiation strikes the outer surface from a first direction, at least a portion of the electromagnetic radiation departs the outer surface in a second direction that is at an angle to the first direction;
combining the optical direction modifiers with the individual ones of the elongate filaments or the subsets of the elongate filaments into a derivative tow so that the optical direction modifiers are interspersed among the elongate filaments; and
applying a resin to cover the elongate filaments and the optical direction modifiers such that the elongate filaments and the optical direction modifiers are covered by the resin in the derivative tow.

21. The method according to claim 20, wherein the elongate filaments are opaque to electromagnetic radiation.

22. The method according to claim 20, wherein:
the optical direction modifiers comprise partial-length optical waveguides;
each of the partial-length optical waveguides comprises a partial-length optical core;
the partial-length optical core of each of the partial-length optical waveguides comprises a first partial-length-optical-core end face, a second partial-length-optical-core end face, opposite the first partial-length-optical-core end face, and a partial-length peripheral surface, extending between the first partial-length-optical-core end face and the second partial-length-optical-core end face; and
each of the partial-length optical waveguides is configured such that when the electromagnetic radiation enters the partial-length optical core via at least one of the first partial-length-optical-core end face, the second partial-length-optical-core end face, or the partial-length peripheral surface, at least a portion of the electromagnetic radiation exits the partial-length optical core via the partial-length peripheral surface.

23. The method according to claim 22, wherein:
the partial-length optical core has a partial-length-optical-core refractive index;
each of the partial-length optical waveguides further comprises a partial-length-optical-core cladding, at least partially covering the partial-length optical core;
the partial-length-optical-core cladding comprises at least a first partial-length-optical-core cladding resin, having a partial-length-optical-core first-cladding-resin refractive index;
the partial-length-optical-core cladding is non-uniform along each of the partial-length optical waveguides; and
the partial-length-optical-core refractive index is greater than the partial-length-optical-core first-cladding-resin refractive index.

24. The method according to claim 23, wherein:
the partial-length peripheral surface of the partial-length optical core of each of the partial-length optical waveguides has partial-length-peripheral-surface regions devoid of the first partial-length-optical-core cladding resin;
the partial-length-optical-core cladding further comprises a second partial-length-optical-core cladding resin, having a partial-length-optical-core second-cladding-resin refractive index;
the second partial-length-optical-core cladding resin covers the partial-length-peripheral-surface regions of the partial-length peripheral surface; and
the partial-length-optical-core second-cladding-resin refractive index is greater than the partial-length-optical-core first-cladding-resin refractive index.

25. The method according to claim 24, wherein the second partial-length-optical-core cladding resin also covers the first partial-length-optical-core cladding resin.

26. The method according to claim 24, wherein:
the resin has a resin refractive index; and
the resin refractive index is greater than the partial-length-optical-core second-cladding-resin refractive index.

27. The method according to claim 22, wherein the partial-length peripheral surface of the partial-length optical core of each of the partial-length optical waveguides has a surface roughness that is selected such that when electromagnetic radiation enters the partial-length optical core via at least one of the first partial-length-optical-core end face, the second partial-length-optical-core end face, or the partial-length peripheral surface, at least a portion of the electromagnetic radiation exits the partial-length optical core via the partial-length peripheral surface.

28. The method according to claim 27, wherein each of the partial-length optical waveguides is devoid of any cladding that covers the partial-length optical core.

29. The method according to claim 20, wherein:
the optical direction modifiers comprise optical direction-modifying particles; and
the optical direction-modifying particles are configured to at least one of reflect, refract, diffract, or Rayleigh-scatter the electromagnetic radiation, incident on the outer surface of any one of the optical direction-modifying particles, to disperse the electromagnetic radiation.

30. The method according to claim 29, wherein:
each of the elongate filaments has a minimum outer dimension; and
each of the optical direction-modifying particles has a maximum outer dimension that is less than one-eighth the minimum outer dimension of any one of the elongate filaments.

31. The method according to claim 29, wherein each of the optical direction-modifying particles has a maximum outer dimension that is less than 1000 nm, 500 nm, 250 nm, or 200 nm.

32. The method according to claim 29, wherein:
the electromagnetic radiation has a wavelength; and
each of the optical direction-modifying particles has a minimum outer dimension that is greater than one-fourth the wavelength of the electromagnetic radiation.

33. The method according to claim 29, wherein each of the optical direction-modifying particles has a minimum outer dimension that is greater than or equal to 50 nm or that is greater than or equal to 100 nm.

34. The method according to claim 29, wherein in the feedstock line, the optical direction-modifying particles comprise less than 10% by weight of the resin, less than 5% by weight of the resin, or less than 1% by weight of the resin.

35. The method according to claim 29, wherein the outer surfaces of at least some of the optical direction-modifying particles are faceted.

36. The method according to claim 29, wherein the outer surfaces of at least some of the optical direction-modifying particles have a surface roughness that is selected such that when electromagnetic radiation strikes the outer surfaces, the electromagnetic radiation is scattered.

37. The method according to claim 29, wherein:
the resin has a resin refractive index;
at least some of the optical direction-modifying particles have a particle refractive index; and
the particle refractive index is greater than or less than the resin refractive index.

38. The method according to claim 29, wherein at least some of the optical direction-modifying particles are spherical.

39. The method according to claim 29, wherein at least some of the optical direction-modifying particles are prismatic.

40. The method according to claim 20, wherein the resin is applied to cover the elongate filaments and the optical direction modifiers, such that the elongate filaments and the optical direction modifiers are covered by the resin in the derivative tow, at least one of before or after separating the precursor tow into the individual ones of the elongate filaments or into the subsets of the elongate filaments.

41. The method according to claim 20, wherein:
the step of separating the precursor tow into individual ones of the elongate filaments or into subsets of the elongate filaments comprises imparting a first electrical charge to the elongate filaments;
the step of applying the resin to cover the elongate filaments and the optical direction modifiers such that the elongate filaments and the optical direction modifiers are covered by the resin in the derivative tow comprises imparting a second electrical charge to the resin; and
the second electrical charge and the first electrical charge have opposite signs.

42. The method according to claims 20, wherein:
the step of combining the optical direction modifiers with the individual ones of the elongate filaments or the subsets of the elongate filaments into the derivative tow so that the optical direction modifiers are interspersed among the elongate filaments comprises combining the individual ones of the elongate filaments and at least one full-length optical waveguide or the subsets of the elongate filaments and at least the one full-length optical waveguide into the derivative tow so that each of the elongate filaments and at least the one full-length optical waveguide extends along all of the feedstock-line length and at least the one full-length optical waveguide is interspersed among the elongate filaments; and
the step of applying the resin to cover the elongate filaments and the optical direction modifiers such that the elongate filaments and the optical direction modifiers are covered by the resin in the derivative tow comprises applying the resin to cover at least the one full-length optical waveguide in the derivative tow.

43. The method according to claim 42, wherein the resin is applied to cover the elongate filaments and at least the one full-length optical waveguide, such that the elongate filaments and at least the one full-length optical waveguide are covered by the resin in the derivative tow, at least one of before or after combining the individual ones of the elongate filaments or the subsets of the elongate filaments and at least the one full-length optical waveguide into the derivative tow.

44. The method according to claim 42, wherein:
at least the one full-length optical waveguide comprises a full-length optical core;
the full-length optical core comprises a first full-length-optical-core end face, a second full-length-optical-core end face, opposite the first full-length-optical-core end face, and a full-length peripheral surface, extending between the first full-length-optical-core end face and the second full-length-optical-core end face; and
at least the one full-length optical waveguide is configured such that when electromagnetic radiation enters the full-length optical core via at least one of the first full-length-optical-core end face, the second full-length-optical-core end face, or the full-length peripheral surface, at least a portion of the electromagnetic radiation exits the full-length optical core via the full-length peripheral surface.

45. The method according to claim 44, wherein at least the one full-length optical waveguide is configured such that when the electromagnetic radiation enters the first full-length-optical-core end face of the full-length optical core, an initial portion of the electromagnetic radiation exits the full-length optical core via the full-length peripheral surface and a final portion of the electromagnetic radiation, remaining in the full-length optical core after the initial portion of the electromagnetic radiation exits the full-length optical core, exits the full-length optical core via the second full-length-optical-core end face.

46. The method according to claim 45, wherein at least the one full-length optical waveguide is configured such that the initial portion of the electromagnetic radiation, which exits the full-length optical core via the full-length peripheral surface, is greater than or equal to the final portion of the electromagnetic radiation, which exits the full-length optical core via the second full-length-optical-core end face.

47. The method according to claim 44, wherein:
the full-length optical core has a full-length-optical-core refractive index;
at least the one full-length optical waveguide further comprises a full-length-optical-core cladding, at least partially covering the full-length optical core;
the full-length-optical-core cladding comprises at least a first full-length-optical-core cladding resin, having a full-length-optical-core first-cladding-resin refractive index;
the full-length-optical-core cladding is non-uniform along at least the one full-length optical waveguide; and
the full-length-optical-core refractive index is greater than the full-length-optical-core first-cladding-resin refractive index.

48. The method according to claim 47, wherein:
the full-length peripheral surface has full-length-peripheral-surface regions devoid of the first full-length-optical-core cladding resin;
the full-length-optical-core cladding further comprises a second full-length-optical-core cladding resin, having a full-length-optical-core second-cladding-resin refractive index;
the second full-length-optical-core cladding resin covers the full-length-peripheral-surface regions of the full-length peripheral surface; and
the full-length-optical-core second-cladding-resin refractive index is greater than the full-length-optical-core first-cladding-resin refractive index.

49. The method according to claim 48, wherein the second full-length-optical-core cladding resin also covers the first full-length-optical-core cladding resin.

50. The method according to claim 48, wherein:
the resin has a resin refractive index; and
the resin refractive index is greater than the full-length-optical-core second-cladding-resin refractive index.

51. The method according to claim 44, wherein the full-length peripheral surface has a surface roughness that is selected such that when electromagnetic radiation enters the full-length optical core via at least one of the first full-length-optical-core end face, the second full-length-optical-core end face, or the full-length peripheral surface, at least a portion of the electromagnetic radiation exits the full-length optical core via the full-length peripheral surface.

52. The method according to claim 51, wherein at least the one full-length optical waveguide is devoid of any cladding that covers the full-length optical core.

53. The method according to claim 42, wherein the step of combining the individual ones of the elongate filaments and at least the one full-length optical waveguide or the subsets of the elongate filaments and at least the one full-length optical waveguide into the derivative tow comprises at least one of twisting, weaving, or braiding the individual ones of the elongate filaments and at least the one full-length optical waveguide, or the subsets of the elongate filaments and at least the one full-length optical waveguide, into the derivative tow.

54. The system according to claim 5, wherein the second partial-length-optical-core cladding resin also covers the first partial-length-optical-core cladding resin.

55. The system according to claim 7, wherein each of the partial-length optical waveguides is devoid of any cladding that covers the partial-length optical core.

56. The system according to claim 8, wherein at least some of the optical direction-modifying particles are spherical.

57. The system according to claim 1, further comprising:
a full-length-optical-waveguide supply, configured to dispense at least one full-length optical waveguide; and
wherein:
the combiner is further configured to combine at least the one full-length optical waveguide, dispensed by the full-length-optical-waveguide supply, with the individual ones of the elongate filaments or the subsets of the elongate filaments, originating from the filament separator, and the optical direction modifiers into the derivative tow so that at least the one full-length optical waveguide is interspersed among the elongate filaments; and
the resin supply is further configured such that at least the one full-length optical waveguide in the derivative tow is covered by the resin.

58. The system according to claim 57, wherein:
at least the one full-length optical waveguide comprises a full-length optical core;
the full-length optical core comprises a first full-length-optical-core end face, a second full-length-optical-core end face, opposite the first full-length-optical-core end face, and a full-length peripheral surface, extending between the first full-length-optical-core end face and the second full-length-optical-core end face; and
at least the one full-length optical waveguide is configured such that when electromagnetic radiation enters the full-length optical core via at least one of the first full-length-optical-core end face, the second full-length-optical-core end face, or the full-length peripheral surface, at least a portion of the electromagnetic radiation exits the full-length optical core via the full-length peripheral surface.

59. The system according to claim 58, wherein at least the one full-length optical waveguide is configured such that when the electromagnetic radiation enters the first full-length-optical-core end face of the full-length optical core, an initial portion of the electromagnetic radiation exits the full-length optical core via the full-length peripheral surface and a final portion of the electromagnetic radiation, remaining in the full-length optical core after the initial portion of the electromagnetic radiation exits the full-length optical core, exits the full-length optical core via the second full-length-optical-core end face.

60. The system according to claim 59, wherein at least the one full-length optical waveguide is configured such that the initial portion of the electromagnetic radiation, which exits the full-length optical core via the full-length peripheral surface, is greater than or equal to the final portion of the electromagnetic radiation, which exits the full-length optical core via the second full-length-optical-core end face.

61. The system according to claim 58, wherein:
the full-length optical core has a full-length-optical-core refractive index;
at least the one full-length optical waveguide further comprises a full-length-optical-core cladding, at least partially covering the full-length optical core;

the full-length-optical-core cladding comprises at least a first full-length-optical-core cladding resin, having a full-length-optical-core first-cladding-resin refractive index;
the full-length-optical-core cladding is non-uniform along at least the one full-length optical waveguide; and
the full-length-optical-core refractive index is greater than the full-length-optical-core first-cladding-resin refractive index.

62. The system according to claim 61, wherein:
the full-length peripheral surface has full-length-peripheral-surface regions devoid of the first full-length-optical-core cladding resin;
the full-length-optical-core cladding further comprises a second full-length-optical-core cladding resin, having a full-length-optical-core second-cladding-resin refractive index;
the second full-length-optical-core cladding resin covers the full-length-peripheral-surface regions of the full-length peripheral surface; and
the full-length-optical-core second-cladding-resin refractive index is greater than the full-length-optical-core first-cladding-resin refractive index.

63. The system according to claim 62, wherein the second full-length-optical-core cladding resin also covers the first full-length-optical-core cladding resin.

64. The system according to claim 62, wherein:
the resin has a resin refractive index; and
the resin refractive index is greater than the full-length-optical-core second-cladding-resin refractive index.

65. The system according to claim 58, wherein the full-length peripheral surface has a surface roughness that is selected such that when electromagnetic radiation enters the full-length optical core via at least one of the first full-length-optical-core end face, the second full-length-optical-core end face, or the full-length peripheral surface, at least a portion of the electromagnetic radiation exits the full-length optical core via the full-length peripheral surface.

66. The system according to claim 65, wherein at least the one full-length optical waveguide is devoid of any cladding that covers the full-length optical core.

67. The system according to claim 57, wherein the combiner is configured to at least one of twist, weave, or braid the individual ones of the elongate filaments and at least the one full-length optical waveguide, dispensed by the full-length-optical-waveguide supply, or the subsets of the elongate filaments, originating from the filament separator, and at least the one full-length optical waveguide, dispensed by the full-length-optical-waveguide supply, into the derivative tow.

* * * * *